(12) United States Patent
Cui et al.

(10) Patent No.: US 8,795,912 B2
(45) Date of Patent: Aug. 5, 2014

(54) SYSTEMS AND PROCESSES FOR OPERATING FUEL CELL SYSTEMS

(75) Inventors: Jingyu Cui, Katy, TX (US); Erik Edwin Engwall, Houston, TX (US); John William Johnston, Kingwood, TX (US); Mahendra Ladharam Joshi, Katy, TX (US); Scott Lee Wellington, Bellaire, TX (US)

(73) Assignee: Shell Oil Company, Houston, TX (US)

( * ) Notice: Subject to any disclaimer, the term of this patent is extended or adjusted under 35 U.S.C. 154(b) by 514 days.

(21) Appl. No.: 13/009,233

(22) Filed: Jan. 19, 2011

(65) Prior Publication Data

US 2011/0111314 A1    May 12, 2011

Related U.S. Application Data

(63) Continuation-in-part of application No. 12/797,543, filed on Jun. 9, 2010, now abandoned.

(60) Provisional application No. 61/187,539, filed on Jun. 16, 2009.

(51) Int. Cl.
*H01M 8/18* (2006.01)
*H01M 8/06* (2006.01)

(52) U.S. Cl.
USPC ............ 429/417; 429/408; 429/415; 429/416

(58) Field of Classification Search
USPC .................................. 429/415, 427, 444, 472
See application file for complete search history.

(56) References Cited

U.S. PATENT DOCUMENTS

| | | | |
|---|---|---|---|
| 3,669,752 A | 6/1972 | Nocack et al. | |
| 4,079,171 A | 3/1978 | Marianowsky et al. | |
| 4,522,894 A | 6/1985 | Hwang et al. | |
| 5,068,159 A * | 11/1991 | Kinoshita | ................ 429/415 X |
| 5,084,362 A | 1/1992 | Farooque | |
| 5,149,600 A | 9/1992 | Yamase et al. | |
| 5,208,114 A | 5/1993 | Uematsu et al. | |
| 5,380,600 A * | 1/1995 | Hansen et al. | ................ 429/415 |

(Continued)

FOREIGN PATENT DOCUMENTS

WO    2007014128    2/2007

OTHER PUBLICATIONS

Watanabe et al. "Applicability of molten carbonate fuel cells to various fuels," Journal of Power Sources, 2006, pp. 868-871 (August).

(Continued)

*Primary Examiner* — Kwang Han
(74) *Attorney, Agent, or Firm* — Charles W. Stewart

(57) ABSTRACT

Processes and systems for operating molten carbonate fuel cell systems are described herein. A process for operating a molten carbonate fuel cell system includes providing a hydrogen-containing stream comprising molecular hydrogen to an anode portion of a molten carbonate fuel cell; controlling a flow rate of the hydrogen-containing stream to the anode such that molecular hydrogen utilization in the anode is less than 50%; mixing anode exhaust comprising molecular hydrogen from the molten carbonate fuel cell with a hydrocarbon stream comprising hydrocarbons, contacting at least a portion of the mixture of anode exhaust and the hydrocarbon stream with a catalyst to produce a steam reforming feed; separating at least a portion of molecular hydrogen from the steam reforming feed; and providing at least a portion of the separated molecular hydrogen to the molten carbonate fuel cell anode.

9 Claims, 11 Drawing Sheets

(56) References Cited

U.S. PATENT DOCUMENTS

| | | |
|---|---|---|
| 6,018,471 A | 1/2000 | Titus et al. |
| 6,152,987 A | 11/2000 | Ma et al. ............................ 95/56 |
| 6,165,633 A | 12/2000 | Negishi |
| 6,322,916 B1 * | 11/2001 | Hemmes et al. .............. 429/415 |
| 6,368,735 B1 * | 4/2002 | Lomax et al. ................. 429/411 |
| 6,656,617 B2 | 12/2003 | Aoyama et al. |
| 6,997,703 B2 | 2/2006 | Kurashima et al. |
| 7,097,925 B2 | 8/2006 | Keefer .............................. 429/9 |
| 7,285,350 B2 | 10/2007 | Keefer et al. |
| 2001/0018139 A1 | 8/2001 | Aoyama et al. |
| 2004/0115504 A1 | 6/2004 | Moeller et al. |
| 2006/0127718 A1 | 6/2006 | Kurashima et al. |
| 2006/0248800 A1 | 11/2006 | Miglin et al. |
| 2007/0190382 A1 | 8/2007 | Fischer |
| 2007/0243127 A1 | 10/2007 | Fedorov et al. |
| 2008/0081018 A1 | 4/2008 | Inui et al. |
| 2008/0090114 A1 | 4/2008 | Schaevitz et al. |

OTHER PUBLICATIONS

Bloom et al., High Power Density Molten Carbonate Fuel Cells:, The 1995 EPWGRI Fuel Cell Workshop on Fuel Cell Technology Research & Development, US1995, www.osti.gov.

Watanabe et al. "Applicability of Molten Carbonate Fuel Cells to Various Fuels," Journal of Power Sources, 2006, vol. 160, pp. 868-871.

* cited by examiner

SYSTEMS AND PROCESSES FOR OPERATING FUEL CELL SYSTEMS

This is a continuation in part of U.S. application Ser. No. 12/797,543, filed Jun. 9, 2010 now abandoned, which claims the benefit of U.S. Provisional Application No. 61/187,539, filed on Jun. 16, 2009, which applications are hereby incorporated herein by reference.

FIELD OF THE INVENTION

The present invention relates to fuel cell systems and to processes of operating fuel cells. In particular, the present invention relates to systems and processes of operating a molten carbonate fuel cell system.

BACKGROUND OF THE INVENTION

Molten carbonate fuel cells convert chemical energy into electrical energy. Molten carbonate fuel cells are useful in that they deliver high quality reliable electrical power, are clean operating, and are relatively compact power generators. These features make the use of molten carbonate fuel cells attractive as power sources in urban areas, shipping vessels, or remote areas with limited access to power supplies.

Molten carbonate fuel cells are formed of an anode, a cathode, and an electrolytic layer sandwiched between the anode and cathode. The electrolyte includes alkali carbonate salts, alkaline-earth carbonate salts, molten alkali carbonate salts, or mixtures thereof that may be suspended in a porous, insulating, and chemically inert matrix. An oxidizable fuel gas, or a gas that may be reformed in the fuel cell to an oxidizable fuel gas, is fed to the anode. The oxidizable fuel gas fed to the anode is typically syngas—a mixture of oxidizable components, molecular hydrogen, carbon dioxide, and carbon monoxide. An oxidant-containing gas, typically air and carbon dioxide, may be fed to the cathode to provide the chemical reactants to produce carbonate anions. During operation of the fuel cell, the carbonate anions are constantly renewed.

The molten carbonate fuel cell is operated at a high temperature, typically from 550° C. to 700° C., to react oxygen in the oxidant-containing gas with carbon dioxide to produce carbonate anions. The carbonate anions cross the electrolyte to interact with hydrogen and/or carbon monoxide from the fuel gas at the anode. Electrical power is generated by the conversion of oxygen and carbon dioxide to carbonate ions at the cathode and the chemical reaction of the carbonate ions with hydrogen and/or carbon monoxide at the anode. The following reactions describe the electrical electrochemical reactions in the cell when no carbon monoxide is present:

Cathode charge transfer: $CO_2 + 0.5O_2 + 2e^- \rightarrow CO_3^=$
Anode charge transfer: $CO_3^= + H_2 \rightarrow H_2O + CO_2 + 2e^-$ and
Overall reaction: $H_2 + 0.5O_2 \rightarrow H_2O$ If carbon monoxide is present in the fuel gas, the chemical reactions below describe the electrochemical reactions in the cell.

Cathode charge transfer: $CO_2 + O_2 + 4e^- \rightarrow 2CO_3^=$
Anode charge transfer: $CO_3^= + H_2 \rightarrow H_2O + CO_2 + 2e^-$ and
$CO_3^= + CO \rightarrow 2CO_2 + 2e^-$
Overall reaction: $H_2 + CO + O_2 \rightarrow H_2O + CO_2$ An electrical load or storage device may be connected between the anode and the cathode to allow electrical current to flow between the anode and cathode. The electrical current powers the electrical load or provides electrical power to the storage device.

Fuel gas is typically supplied to the anode by a steam reformer that reforms a low molecular weight hydrocarbon and steam into hydrogen and carbon oxides. Methane, for example, in natural gas, is a preferred low molecular weight hydrocarbon used to produce fuel gas for the fuel cell. Alternatively, the fuel cell anode may be designed to internally effect a steam reforming reaction on a low molecular weight hydrocarbon such as methane and steam supplied to the anode of the fuel cell.

Methane steam reforming provides a fuel gas containing hydrogen and carbon monoxide according to the following reaction: $CH_4 + H_2O \leftrightarrows CO + 3H_2$. Typically, the steam reforming reaction is conducted at temperatures effective to convert a substantial amount of methane and steam to hydrogen and carbon monoxide. Further hydrogen production may be effected in a steam reformer by conversion of steam and carbon monoxide to hydrogen and carbon dioxide by a water-gas shift reaction of: $H_2O + CO \leftrightarrows CO_2 + H_2$.

In a conventionally operated steam reformer used to supply fuel gas to a molten carbonate fuel cell, however, little hydrogen is produced by the water-gas shift reaction since the steam reformer is operated at a temperature that energetically favors the production of carbon monoxide and hydrogen by the steam reforming reaction. Operating at such a temperature disfavors the production of carbon dioxide and hydrogen by the water-gas shift reaction.

Since carbon monoxide may be oxidized in the fuel cell to provide electrical energy while carbon dioxide cannot, conducting the reforming reaction at temperatures favoring the reformation of hydrocarbons and steam to hydrogen and carbon monoxide is typically accepted as a preferred method of providing fuel for the fuel cell. The fuel gas typically supplied to the anode by steam reforming, either externally or internally, therefore, contains hydrogen, carbon monoxide, and small amounts of carbon dioxide, unreacted methane, and water as steam.

Fuel gases containing non-hydrogen compounds such as carbon monoxide, however, are less efficient for producing electrical power in a molten carbonate fuel cell than more pure hydrogen fuel gas streams. At a given temperature, the electrical power that may be generated in a molten carbonate fuel cell increases with increasing hydrogen concentration. This is due to the electrochemical oxidation potential of molecular hydrogen relative to other compounds. For example, Watanabe et al. describe, in "Applicability of molten carbonate fuel cells to various fuels," Journal of Power Sources, 2006, pp. 868-871, that a 10 kW molten carbonate fuel cell stack operated at 90% fuel utilization and a pressure of 0.49 MPa at a current density of 1500 A/m$^2$, with a 50% molecular hydrogen and 50% water feed produces an electrical power density of 0.12 W/cm$^2$ at 0.792 volts while a 50% carbon monoxide and 50% water feed at the same operating conditions produces an electrical power density of only 0.11 W/cm$^2$ at 0.763 volts. Therefore, fuel gas streams containing significant amounts of non-hydrogen compounds are not as efficient in producing electrical power in a molten carbonate fuel cell as fuel gases containing mostly hydrogen.

Molten carbonate fuel cells, however, are typically operated commercially in a "hydrogen-lean" mode, where the conditions of the production of the fuel gas, for example, by steam reforming, are selected to limit the amount of hydrogen exiting the fuel cell in the fuel gas. This is done to balance the electrical energy potential of the hydrogen in the fuel gas with the potential energy (electrochemical+thermal) lost by hydrogen leaving the cell without being converted to electrical energy.

Certain measures have been taken to recapture the energy of the hydrogen exiting the fuel cell, however, these are significantly less energy efficient than if the hydrogen were electrochemically reacted in the fuel cell. For example, the anode exhaust produced from the electrochemically reacting fuel gas in the fuel cell has been combusted to drive a turbine expander to produce electricity. Doing so, however, is significantly less efficient than capturing the electrochemical potential of the hydrogen in the fuel cell since much of the thermal energy is lost rather than converted by the expander to electrical energy. Fuel gas exiting the fuel cell also has been combusted to provide thermal energy for a variety of heat exchange applications. Almost 50% of the thermal energy, however, is lost in such heat exchange applications after combustion. Hydrogen is a very expensive gas to use to fire a burner utilized in inefficient energy recovery systems and, therefore, conventionally, the amount of hydrogen used in the molten carbonate fuel cell is adjusted to utilize most of the hydrogen provided to the fuel cell to produce electrical power and minimize the amount of hydrogen exiting the fuel cell in the fuel cell exhaust.

Other measures have been taken to produce more hydrogen from the fuel gas that is present in the anode exhaust and/or recycle hydrogen in the anode gas by providing the fuel gas to post reformers and/or gas separation units. To recover the hydrogen and/or carbon dioxide, the fuel gas present in the anode is reformed in the post reformer to enrich the anode gas stream in hydrogen and/or subjected to a water-gas shift reaction to form hydrogen and carbon dioxide. Heat may be provided by the anode gas stream.

Heat for inducing the methane steam reforming reaction in a steam reformer and/or converting liquid fuel into feed for the steam reformer has also been provided by burners. Burners that combust an oxygen-containing gas with a fuel, typically a hydrocarbon fuel such as natural gas, may be used to provide the required heat to the steam reformer. Flameless combustion has also been utilized to provide the heat for driving the steam reforming reaction, where the flameless combustion is also driven by providing a hydrocarbon fuel and an oxidant to a flameless combustor in relative amounts that avoid inducing flammable combustion. These methods for providing the heat necessary to drive steam reforming reactions and/or water-gas shift reactions are relatively inefficient energetically since a significant amount of thermal energy provided by combustion is not captured and is lost.

The hydrogen and carbon dioxide in the reformed gas stream may be separated from the anode exhaust, for example, using pressure swing adsorption units and/or membrane separation units. The temperature of the anode exhaust is typically higher than the temperatures required by commercial hydrogen and/or carbon dioxide separation units. The stream may be cooled, for example, through a heat exchanger, however, thermal energy may be lost in the cooling process.

The separated hydrogen is fed to the anode portion of the fuel cell. Recycling the hydrogen to the anode may enrich the fuel gas entering the molten carbonate fuel cell with hydrogen. The separated carbon dioxide is fed to the cathode portion of the fuel cell. Recycling the carbon dioxide to the cathode may enrich the air entering the molten carbonate fuel cell with carbon dioxide.

The cell potential (V) of a molten carbonate fuel cell is given by the difference between the open circuit voltage (E) and the losses. For high temperature fuel cells, activation losses are very small and the cell potential may be obtained over the practical range of current densities by considering only ohmic losses. Thus cell potential V=E–iR, where V and E have units of volts or millivolts, i is the current density (mA/cm$^2$) and R is the total Ohmic resistance ($\Omega$cm$^2$), combining electrolyte, cathode and anode together. The open circuit voltage is the dominant term in the cell potential. The total voltage (electromotive force) for a molten carbonate fuel cell can be expressed using the Nernst Equation, $E=E°+(RT/2F)\ln(P_{H2}P_{O2}^{0.5}/P_{H2O})+(RT/2F)\ln(P_{CO2}^{c}/P_{CO2}^{a})$, where E is the standard cell potential, R is the universal gas constant of 8.314472 JK$^{-1}$mol$^{-1}$, T is the absolute temperature, and F is the Faraday constant of 9.64853399×104 C mol$^{-1}$. As shown, the cell voltage of a molten carbonate fuel cell may be changed by varying the concentrations of carbon dioxide, hydrogen, and oxygen.

Certain measures have been taken to adjust the concentration of hydrogen, oxygen, and carbon dioxide provided to the fuel cell to maximize cell voltage. U.S. Pat. No. 7,097,925 (the '925 Patent) maximizes the denominator of the ratio $$\frac{P_{H2O\ (anode)} \cdot P_{CO2\ (anode)}}{P_{H2\ (anode)} \cdot P_{O2\ (cathode)}^{0.5} \cdot P_{CO2\ (cathode)}}$$

by enriching streams fed to the anode of a molten carbonate fuel cell with hydrogen while enriching streams fed to the cathode with oxygen and carbon dioxide. The enriched streams are provided from pressure swing adsorption units.

While the prior art is effective in providing hydrogen, oxygen, and carbon dioxide to the fuel cell at different concentrations, the process is relatively inefficient in producing the hydrogen, carbon dioxide, and oxygen streams. The process is also relatively thermally inefficient in production of the gases and thermal processes since the anode gas is cooled to remove the water prior to entering the pressure swing adsorption units. In addition, the reformers also do not convert a liquid hydrocarbon feedstock to a lower molecular weight feed for the steam reformer, and insufficient heat is likely provided from the fuel cell to do so.

Further improvement in the efficiency in operating molten carbonate fuel cell systems for producing electricity and enhancing power density of the molten carbonate fuel cell is desirable.

SUMMARY OF THE INVENTION

The present invention is directed to a process for operating a molten carbonate fuel cell, comprising:

providing a hydrogen-containing stream comprising molecular hydrogen to an anode portion of a molten carbonate fuel cell;

controlling a flow rate of the hydrogen-containing stream to the anode such that molecular hydrogen utilization in the anode is less than 50%;

mixing anode exhaust comprising molecular hydrogen from the molten carbonate fuel cell with a hydrocarbon stream comprising hydrocarbons, wherein the anode exhaust mixed with the hydrocarbon stream has a temperature from 500° C. to 700° C.;

contacting at least a portion of the mixture of anode exhaust and the hydrocarbon stream with a catalyst to produce a steam reforming feed comprising one or more gaseous hydrocarbons, molecular hydrogen, and at least one carbon oxide;

separating at least a portion of the molecular hydrogen from the steam reforming feed; and providing at least a portion of the separated molecular hydrogen to the molten carbonate fuel cell anode as at least a portion of the hydrogen-containing stream comprising molecular hydrogen.

In another aspect, the present invention is directed to a molten carbonate fuel cell system, comprising:

a molten carbonate fuel cell configured to receive a hydrogen-containing stream comprising molecular hydrogen at a flow rate such that hydrogen utilization in an anode of the molten carbonate fuel cell is less than 50%;

one or more reformers operatively coupled to the molten carbonate fuel cell, at least one reformer being configured to receive anode exhaust from the molten carbonate fuel cell and hydrocarbons, and being configured to allow the anode exhaust to sufficiently mix with hydrocarbons to at least partially reform some of the hydrocarbons to produce a reformed product stream, wherein the reformed product stream comprises molecular hydrogen and at least one carbon oxide; and a high temperature hydrogen-separation device that is part of, or coupled to, at least one of the reformers and operatively coupled to the molten carbonate fuel cell, wherein the high temperature hydrogen-separation device comprises one or more high temperature hydrogen-separating membranes and is configured to receive a reformed product stream and to provide a stream comprising at least a portion of the molecular hydrogen to the molten carbonate fuel cell.

DETAILED DESCRIPTION OF THE INVENTION

Figure 1:
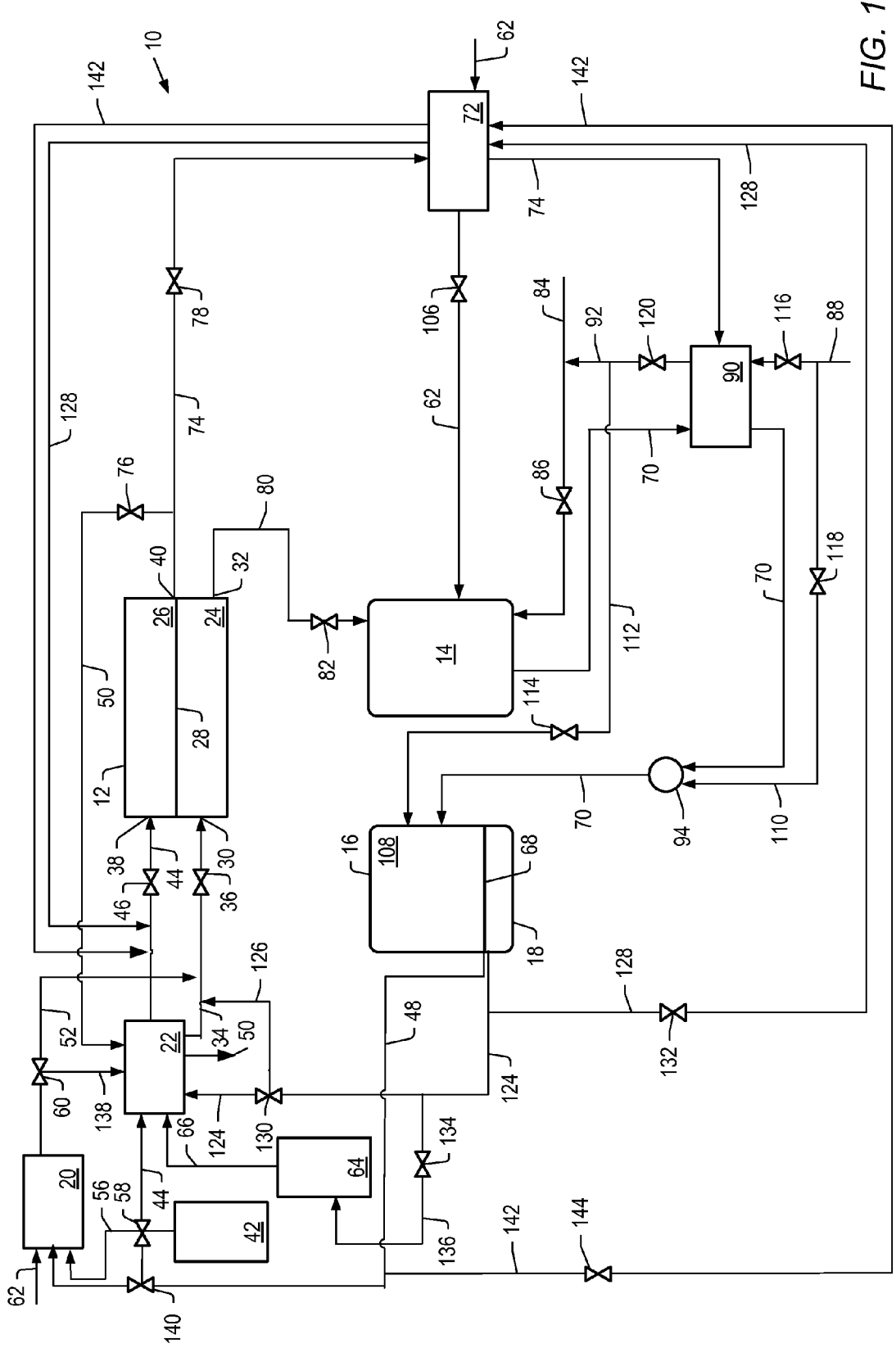
FIG. 1 is a schematic drawing of an embodiment of a system that includes a first reformer and a high temperature hydrogen-separation device in combination with a second reformer for practicing a process described herein.

The present invention described herein provides a highly efficient process for operating a molten carbonate fuel cell to generate electricity at a high electrical power density and a system for performing such a process. First, the process described herein maximizes the electrical power density of the fuel cell system by minimizing, rather than maximizing, the per pass fuel utilization rate of the fuel in the molten carbonate fuel cell. The per pass fuel utilization rate is minimized to reduce the concentration of carbon dioxide and oxidation products, particularly water, throughout the anode path length of the fuel cell such that a high hydrogen concentration is maintained throughout the anode path length. A high electrical power density is provided by the fuel cell since an excess of hydrogen is present for electrochemical reaction at the anode electrode along the entire anode path length of the fuel cell. In a process directed to achieving a high per pass fuel utilization rate, for example, greater than 60% fuel utilization, the concentration of oxidation products and carbon dioxide may comprise greater than 40% of the fuel stream before the fuel has traveled even halfway through the fuel cell. The concentration of oxidation products and carbon dioxide may be several multiples of the concentration of hydrogen in the fuel cell exhaust such that the electrical power provided along the anode path may significantly decrease as the fuel provided to the fuel cell progresses through the anode.

In the process described herein, the anode of a molten carbonate fuel cell is flooded with hydrogen over the entire path length of the anode such that the concentration of hydrogen at the anode electrode available for electrochemical reaction is maintained at a high level over the entire anode path length. Thus, the electrical power density of the fuel cell is maximized.

Use of a hydrogen-rich fuel that is primarily and preferably almost all hydrogen in the process maximizes the electrical power density of the fuel cell system since hydrogen has a significantly greater electrochemical potential than other oxidizable compounds typically used in molten carbonate fuel cell systems (for example, carbon monoxide).

The process described herein produces a higher electrical power density in a molten carbonate fuel cell system than systems disclosed in the art by utilizing a hydrogen-rich fuel and minimizing rather than maximizing the per pass fuel utilization rate of the fuel cell. The minimization is achieved by separating and recycling hydrogen captured from the fuel exhaust, for example, anode exhaust, of the fuel cell and feeding the hydrogen from a feed and the recycle stream at selected rates to minimize the per pass fuel utilization.

The system described herein allows for a hydrogen rich stream to be provided to the molten carbonate fuel cell while minimizing the amount of hydrocarbons provided to the fuel cell as compared to conventional systems. The system generates hydrogen rich streams that may be directly introduced into the anode portion of the molten carbonate fuel cell.

The system does not require a reformer directly coupled to the anode and/or positioned in the anode of the molten carbonate fuel cell to ensure sufficient hydrogen production as fuel for the anode of the fuel cell. Removing or eliminating a reformer or reforming zone in the molten carbonate fuel cell allows the molten carbonate fuel cell to be flooded with hydrogen while supplying a majority of the heat from the anode exhaust to a first reformer. Fuel cells already equipped with internal reforming zones may be used in combination with the systems described herein. Such fuel cells may be operated more economically and more efficiently than systems disclosed in the art.

In the process described herein, the cathode of a molten carbonate fuel cell is flooded with carbon dioxide over the entire path length of the cathode such that the concentration of carbon dioxide at the cathode electrode available for electrochemical reaction is maintained at a high level over the entire cathode path length. Thus, the electrical power density and/or cell voltage of the fuel cell is maximized.

The process described herein utilizes a carbon dioxide rich oxidant gas containing stream, thus allowing operation of the fuel cell such that the carbon dioxide partial pressure in a majority of the cathode portion of the molten carbonate fuel cell is higher than a partial pressure of carbon dioxide in a majority of an anode portion of the molten carbonate fuel cell. Operating the fuel cell in this manner produces a higher electrical power density than systems disclosed in the art.

Utilizing a carbon dioxide rich oxidant gas boosts voltage of the molten carbonate fuel cell and inhibits carbon dioxide starvation of the molten carbonate fuel cell. "Carbon dioxide starvation" refers to when the partial pressure of carbon dioxide ($P_{CO2}^c$) exiting the cathode is less than the partial pressure of carbon dioxide ($P_{CO2}^a$) exiting the anode. Providing excess carbon dioxide to the molten carbonate fuel cell at a minimum hydrogen utilization allows higher voltage and/or current density to be obtained from the molten carbonate fuel cell.

The system described herein allows for a carbon dioxide rich stream to be provided to the molten carbonate fuel cell from the hydrocarbons provided to the fuel cell, as compared to conventional systems. Carbon dioxide generated from the system may be directly introduced into the cathode portion of the molten carbonate fuel cell. The system does not require an external source of carbon dioxide to ensure sufficient carbon dioxide as feed for the cathode of the fuel cell.

The process described herein is also highly efficient since hydrogen and carbon dioxide not utilized to produce electricity in the fuel cell are recycled continuously through the fuel cell system. This enables production of a high electrical power density relative to the lowest heating value of the fuel by eliminating the problem associated with losing energy by hydrogen and/or carbon dioxide leaving the cell without being converted to electrical energy.

The system allows simultaneous feeding of an appropriate amount of air or molecular oxygen to the cathode of the fuel cell such that the carbon dioxide to molecular oxygen molar ratio in the feed to the cathode minimizes concentration polarization at the electrodes of the fuel cell. The system does not require oxygen enrichment of air. The process of the invention allows simultaneous flooding of the anode with hydrogen and simultaneous flooding of the cathode with carbon dioxide, while controlling the quantity of molecular oxygen such that the carbon dioxide to molecular oxygen molar ratio in the feed to the cathode is at least 2 or at least 2.5.

Using the fuel cell system described in the invention allows the molten carbonate fuel cell to be operated at 0.1 MPa (1 atm) at a high power density. Typically, molten carbonate fuel cells are operated at pressures of from atmospheric to about 1 MPa (10 atm). Operating at pressures above atmospheric may affect the life span of seals in various portions of the molten carbonate fuel cells. Operating the molten carbonate fuel cell at or near atmospheric pressures may extend the life span of seals in the molten carbonate fuel cells while producing electricity with high current densities for given cell voltages and/or power densities.

In the process described herein, relatively little carbon dioxide is generated per unit of electricity produced by the process. The thermal integration of a first reformer, a second reformer, and a high temperature hydrogen-separation device with fuel cell, where the heat produced in the fuel cell is transferred directly within the first reformer by providing the hot anode exhaust stream from the fuel cell to the first reformer, and subsequently feeding the product of the first reformer directly within the second reformer, and then providing the product of the second reformer directly to the high temperature hydrogen-separation device, reduces, and preferably eliminates, additional energy required to be provided to drive the endothermic reforming reactions in one or both reformers. Such thermal integration reduces the need to provide additional energy, for example by combustion. Thus, the amount of carbon dioxide produced in providing energy to drive the reforming reaction(s) is reduced.

Recycling the anode exhaust stream through the system and provision of a carbon dioxide gas stream to the fuel cell, by separating the carbon dioxide from the reformed gas product and then feeding the carbon dioxide containing gas stream to the fuel cell, reduces the amount of carbon dioxide required to be produced by combustion. Such recycling increases the electrical efficiency of the process, and thereby reduces any carbon dioxide emissions.

Additionally, recycling the anode exhaust stream through the system and provision of a hydrogen-containing gas stream rich in molecular hydrogen to the fuel cell, by separating the hydrogen-containing gas stream from the reformed gas product, and then feeding the hydrogen-containing gas stream to the fuel cell, reduces the amount of hydrogen required to be produced by the second reformer. Such recycling of anode exhaust increases the electrical efficiency of the process. Furthermore, power density of the molten carbonate fuel cell is improved, thus for the same amount of power generated, fuel cells having smaller dimensions than conventional fuel cells may be used to generate power.

The process described herein is more thermally and energetically efficient than processes disclosed in the art. Thermal energy from a fuel cell exhaust is transferred directly into a first reformer. In some embodiments, a portion of the transferred thermal energy is subsequently transferred from the first reformer into a second reformer. The transfer of thermal energy directly from the anode exhaust of the fuel cell to the first reformer is highly efficient since the transfer is effected by molecularly mixing a hot anode exhaust stream from the fuel cell directly with a hydrocarbon stream comprising hydrocarbons and steam in the first reformer. A hot feed is produced from the first reformer and subsequently fed to the second reformer. The transfer of thermal energy from the first reformer to the second reformer is also highly efficient since the thermal energy is contained in the feed fed from the first reformer to the second reformer.

The process described herein is also more thermally efficient than processes disclosed in the art since the heat from the anode exhaust is used to produce hydrogen at lower temperatures than typical steam reforming processes. In the process of the present invention, hydrogen may be separated from the reformed product gases using a high temperature hydrogen-separating device, where the high temperature hydrogen-separating device is a membrane separation device. The high temperature hydrogen-separation device may be operatively coupled to the second reformer such that the hydrogen may be separated from the reformed gases as the reforming reaction occurs in the second reformer. Separation of the hydrogen drives the equilibrium towards production of hydrogen and lowers the temperature required to produce hydrogen. Further, more hydrogen may be produced at the lower reforming temperatures since the equilibrium of the water-gas shift reaction ($H_2O+CO \leftrightarrows CO_2+H_2$) favors the production of hydrogen at the lower reforming temperatures, whereas it is not favored at conventional reforming reaction temperatures. A substantial amount, or all, of the molecular hydrogen and carbon dioxide produced from the second reformer is provided to the molten carbonate fuel cell.

The process described herein allows liquid fuel to be utilized. Use of liquid fuel allows one fuel to be used for more than one power source. For example, diesel fuel could be used on a vessel to power a molten carbonate fuel cell and engines. Hydrogen is added to the first reformer through mixing of the anode exhaust with the liquid feed. Recycling of the hydrogen eliminates a need for a separate hydrogen source for thermal cracking of the liquid feed. Although some hydrogen is consumed, hydrogen is generated upon reformation of the cracked hydrocarbons. The integration of the reformers and high temperature hydrogen-separation device allows the system to generate substantially all the hydrogen needed for the processes.

Reforming and/or hydrocracking of liquid fuels generates more carbon dioxide per mole of hydrogen produced because the hydrogen to carbon ratio is lower for fuels having a carbon number greater than 6 (for example, diesel and naphtha) than for fuels having a carbon number less than 6 (for example, methane). Generation of more carbon dioxide per mole of hydrogen produced allows substantially all, or all, of the carbon dioxide needed for the molten carbonate fuel cell to be generated from the liquid fuel. Generation of carbon dioxide in this manner may eliminate or reduce the need to use a portion of the anode gas and/or feed gas as a fuel for thermally inefficient combustion burners to generate carbon dioxide. In the process described herein, excess hydrogen and carbon dioxide is produced which allows the hydrogen and carbon dioxide to be recycled through the system.

The process of the invention allows the molten carbonate fuel cell to be operated at pressures of at or less than 0.1 MPa (1 atm) and provides a power density of at least 0.12 W/cm$^2$ and/or a cell voltage of at least 800 mV. In some embodiments, the process of the invention allows the molten carbonate fuel cell to be operated at pressures of, at, or less than 0.1 MPa (1 atm) and provides a power density of at least 0.12 W/cm$^2$ and/or a cell voltage of at least 800 mV.

As used herein, the term "hydrogen" refers to molecular hydrogen unless specified otherwise.

As used herein, the term "hydrogen source" refers to a compound from which free hydrogen may be generated. For example, a hydrogen source may be a hydrocarbon such as methane, or mixtures of such compounds, or a hydrocarbon containing mixture such as natural gas.

As used herein, when two or more elements are described as "operatively connected" or "operatively coupled," the elements are defined to be directly or indirectly connected to allow direct or indirect fluid flow between the elements. The term "fluid flow," as used herein, refers to the flow of a gas or a fluid. As used in the definition of "operatively connected" or "operatively coupled" the term "indirect fluid flow" means that the flow of a fluid or a gas between two defined elements may be directed through one or more additional elements to change one or more aspects of the fluid or gas as the fluid or gas flows between the two defined elements. Aspects of a fluid or a gas that may be changed in indirect fluid flow include physical characteristics, such as the temperature or the pressure of a gas or a fluid, and/or the composition of the gas or fluid, for example, by separating a component of the gas or fluid, or by condensing water from a gas stream containing steam. "Indirect fluid flow," as defined herein, excludes changing the composition of the gas or fluid between the two defined elements by chemical reaction, for example, oxidation, or reduction of one or more elements of the fluid or gas.

As used herein, the term "selectively permeable to hydrogen," is defined as permeable to molecular hydrogen or elemental hydrogen and impermeable to other elements or compounds such that at most 10%, or at most 5%, or at most 1% of the non-hydrogen elements or compounds may permeate what is permeable to the molecular or elemental hydrogen.

As used herein, the term "high temperature hydrogen-separation device," is defined as a device or apparatus effective for separating hydrogen, in molecular or elemental form, from a gas stream at a temperature of at least 250° C. (for example, at temperatures from 300° C. to 650° C.)

As used herein, "per pass hydrogen utilization" as referring to the utilization of hydrogen in a fuel in a molten carbonate fuel cell, is defined as the amount of hydrogen in a fuel utilized to generate electricity in one pass through the molten carbonate fuel cell relative to the total amount of hydrogen in a fuel input into the fuel cell for that pass. The per pass hydrogen utilization may be calculated by measuring the amount of hydrogen in a fuel fed to the anode of a fuel cell, measuring the amount of hydrogen in the anode exhaust of the fuel cell, subtracting the measured amount of hydrogen in the anode exhaust of the fuel cell from the measured amount of hydrogen in the fuel fed to the fuel cell to determine the amount of hydrogen used in the fuel cell, and dividing the calculated amount of hydrogen used in the fuel cell by the measured amount of hydrogen in the fuel fed to the fuel cell. The per pass hydrogen utilization may be expressed as a percent by multiplying the calculated per pass hydrogen utilization by 100.

As used herein, "excess carbon dioxide" refers a value for the partial pressure difference of carbon dioxide ($\Delta P_{CO2}$) of the anode and cathode of the molten carbonate fuel cell. "Excess carbon dioxide" ($\Delta P_{CO2}$) is calculated by measuring the partial pressure of the carbon dioxide in the anode exhaust and the cathode exhaust at the anode and cathode outlets, respectively, and subtracting the measured carbon dioxide partial pressure value for the anode from the measured carbon dioxide partial pressure value for the cathode (e.g. $\Delta P_{CO2} = (P_{CO2}^{c}) - (P_{CO2}^{a})$). For a counter current flow of feeds to the anode and cathode, the "excess carbon dioxide" is calculated by measuring the partial pressure of the carbon dioxide in the anode exhaust and the cathode exhaust at the anode outlet and cathode inlet and subtracting the measured carbon dioxide partial pressure value for the anode from the measured value carbon dioxide partial pressure for the cathode (e.g. $\Delta P_{CO2} = (P_{CO2}^{cinlet}) - (P_{CO2}^{aoutlet})$).

Average excess carbon dioxide is calculated by the following equation.

$$P_{CO2}(avg) = [\{P_{CO2}^{cinlet} + P_{CO2}^{coutlet}\} - \{P_{CO2}^{ainlet} + P_{CO2}^{aoutlet}\}]/2$$

"Local excess carbon dioxide" refers a value for the partial pressure difference of carbon dioxide ($\Delta P_{CO2(local)}$) of the molten carbonate fuel cell per percent of hydrogen utilization over a normalized distance where symmetry is assumed in the y direction (width). Local excess carbon dioxide is calculated by $\Delta P_{CO2}(x) = (P_{CO2}^{c})(x) - (P_{CO2}^{a})(x)$, where x is a normalized distance along the length of the anode compartment.

Figure 2:
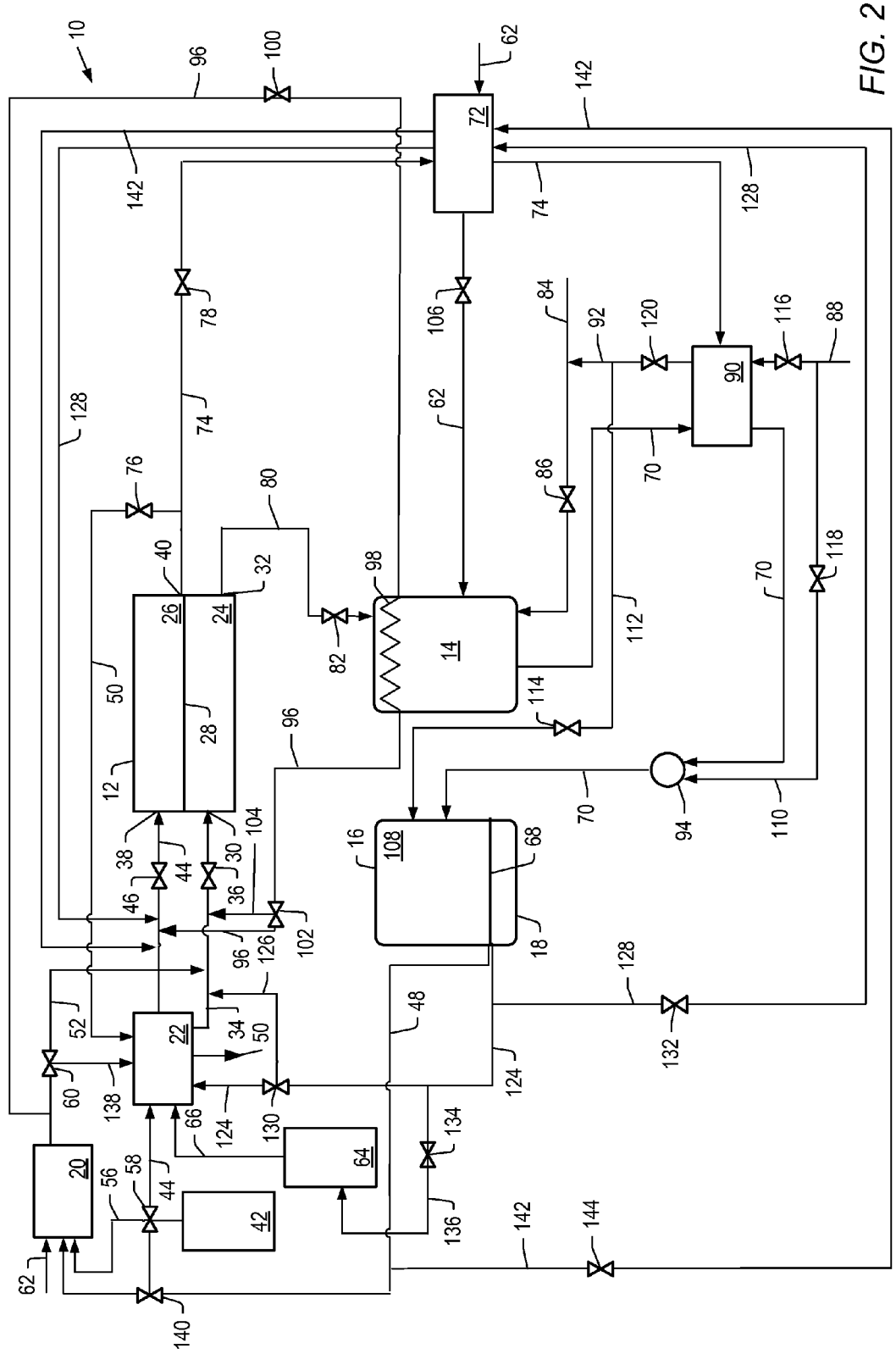
FIG. 2 is a schematic drawing of an embodiment of a system that includes a first reformer with a heat exchanger, and a high temperature hydrogen-separation device in combination with a second reformer for practicing a process described herein.
Figure 3:
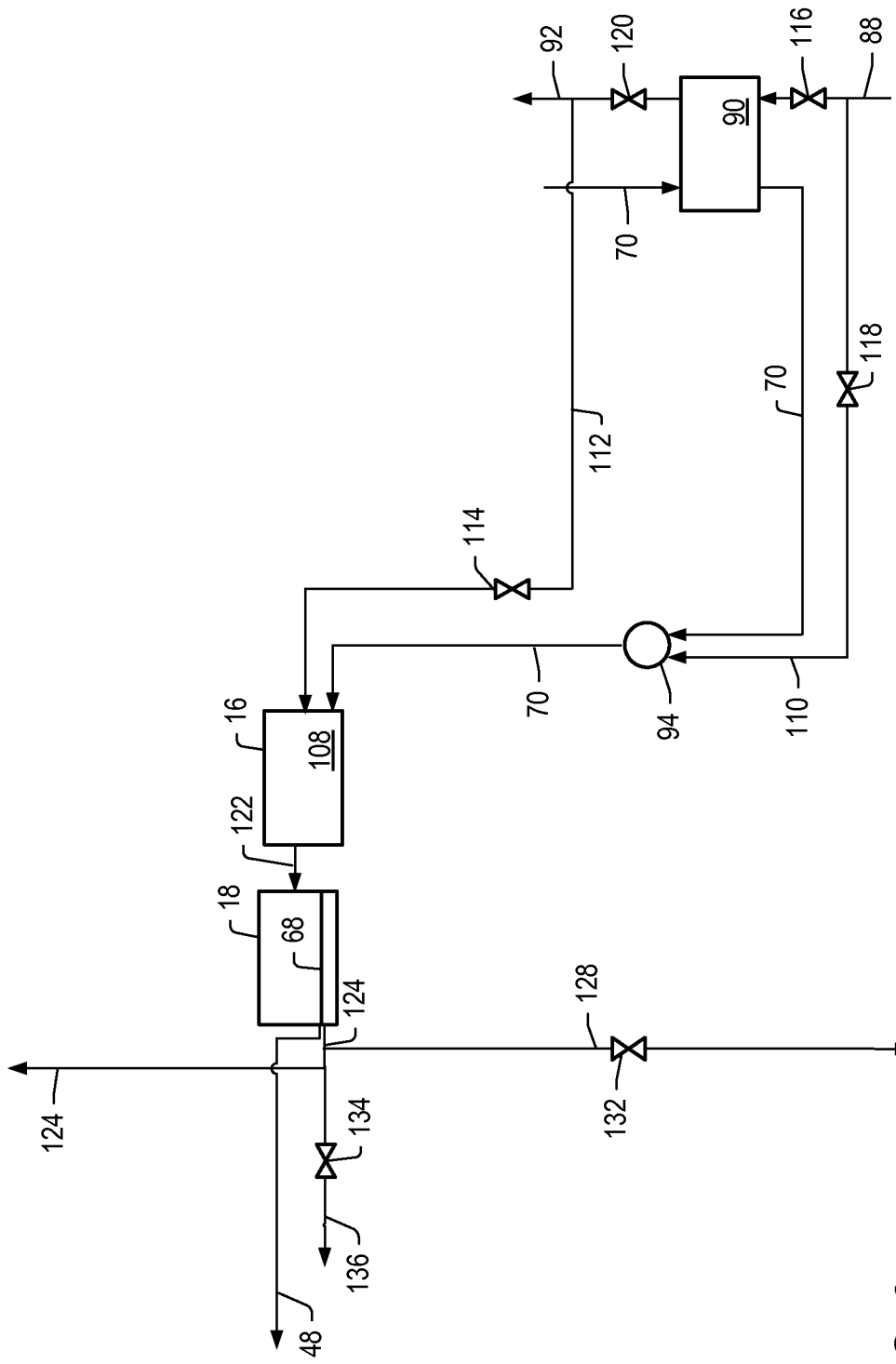
FIG. 3 is a schematic drawing of an embodiment of a portion of the system in which the high temperature hydrogen-separation device is located exterior of the second reformer.

FIGS. 1-3 depict schematics of embodiments of systems of the present invention for conducting processes in accordance with the present invention for operating a molten carbonate fuel cell to generate electricity. Fuel cell system 10 includes molten carbonate fuel cell 12, first reformer 14, second reformer 16, high temperature hydrogen-separation device 18, and oxidizing unit 20. In a preferred embodiment, second reformer 16, high temperature hydrogen-separation device 18, and oxidizing unit 20 are one unit. In a preferred embodiment, oxidizing unit 20 is a catalytic partial oxidation reformer. In an embodiment, high temperature hydrogen-separation device 18 is a molecular hydrogen membrane separation device. In an embodiment, second reformer 16 includes a reforming zone, high temperature hydrogen-separation device 18, catalytic partial oxidation reformer 20, and heat exchanger 22. The thermally integrated system provides sufficient hydrogen and carbon dioxide for continuous operation of the molten carbonate fuel cell to generate electricity.

Molten carbonate fuel cell 12 includes anode 24, cathode 26, and electrolyte 28. Electrolyte 28 is interposed between and contacts anode 24 and cathode 26. Molten carbonate fuel cell 12 may be a conventional molten carbonate fuel cell and may, preferably, have a tubular or planar configuration. Molten carbonate fuel cell 12 may include a plurality of individual fuel cells stacked together. The individual fuel cells may be joined electrically by interconnects and operatively connected such that one or more gas streams may flow through the anodes of the stacked fuel cells and an oxidant-containing gas may flow through the cathodes of the stacked fuel cells. As used herein, the term "molten carbonate fuel cell" is defined as either a single molten carbonate fuel cell or a plurality of operatively connected or stacked molten carbonate fuel cells. Anode 24 of molten carbonate fuel cell 12 may be formed of porous sintered nickel compounds, nickel-chromium alloys, nickel with lithium-chromium oxide and/or nickel-copper alloys, or any material suitable for use as anodes for molten carbonate fuel cells. Cathode 26 of molten carbonate fuel cell 12 may be formed of porous, sintered materials such as nickel oxide, lithium-nickel-iron oxides, or any material suitable for use as a cathode for molten carbonate fuel cells.

Gas streams are fed to the anode and cathode to provide the reactants necessary to generate electricity in fuel cell 12. Hydrogen-containing streams enter anode 24 and oxidant-containing gas streams enter cathode 26. Electrolyte section 28 is positioned in the fuel cell to prevent hydrogen-containing gas stream(s) from entering the cathode and to prevent the oxidant-containing gas stream(s)—oxygen and carbon dioxide streams—from entering the anode. Oxidant-containing gas stream(s) include one or more streams that contain oxygen and/or carbon dioxide.

Electrolyte section 28 conducts carbonate ions from the cathode to the anode for electrochemical reaction with oxidizable compounds in the anode gas stream such as hydrogen and, optionally, carbon monoxide at the one or more anode electrodes. Electrolyte section 28 may be formed of molten salts of alkali metal carbonates, alkaline-earth metal carbonates, or combinations thereof. Examples of electrolyte materials include porous materials formed from lithium-sodium carbonate, lithium carbonate, sodium carbonate, lithium-sodium-barium carbonate, lithium-sodium-calcium carbonate, and lithium-potassium carbonate.

Fuel cell 12 is configured to allow hydrogen-containing gas stream(s) to flow from anode inlet 30 through anode 24 and out anode exhaust outlet 32. The hydrogen-containing gas stream contacts one or more anode electrodes over the anode path length from the anode inlet 30 to the anode exhaust outlet 32.

In an embodiment, a gas stream containing molecular hydrogen, hereinafter, "a hydrogen-containing stream," or a hydrogen source is fed though line 34 to anode inlet 30. Metering valve 36 may be used to select and control the flow rate of the hydrogen-containing stream to anode inlet 30. In a preferred embodiment, hydrogen is fed from high temperature hydrogen-separation device 18, where the high temperature hydrogen-separation device is a membrane unit, to anode 24 of fuel cell 12 as described in detail below. In an embodiment, the hydrogen-containing gas stream may contain at least 0.6, or at least 0.7, or at least 0.8, or at least 0.9, or at least 0.95, or at least 0.98 mole fraction hydrogen.

A gas fed to the cathode includes an oxidant. As referred to herein, "oxidant" refers to a compound capable of being reduced by interaction with molecular hydrogen. In some embodiments, the oxidant-containing gas fed to the cathode includes oxygen, carbon dioxide, inert gases, or mixtures thereof. In an embodiment, the oxidant-containing gas is a combination of an oxygen-containing gas stream and a carbon dioxide containing gas stream, or an oxygen/carbon dioxide-containing stream. In a preferred embodiment, the oxidant-containing gas fed to the cathode is air or oxygen enriched air that has been blended with enough carbon dioxide such that the molar ratio of carbon dioxide to oxygen is at least 2 or at least 2.5.

An oxidant-containing gas may flow from cathode inlet 38 through cathode 26 and then out through cathode exhaust outlet 40. The oxidant-containing gas contacts one or more cathode electrodes over the cathode path length from cathode inlet 38 to cathode exhaust outlet 40. In one embodiment, an oxidant-containing gas may flow counter-current to the flow of a hydrogen-containing gas flowing to anode 24 of fuel cell 12.

In an embodiment, the oxidant-containing gas stream is fed from oxidant-containing gas source 42 to cathode inlet 38 through line 44. Metering valve 46 may be used to select and control the rate the gas stream is fed to cathode 26. In some embodiments, the oxidant-containing gas is provided by an air compressor. The oxidant-containing gas stream may be air. In one embodiment, the oxidant-containing gas may be pure oxygen. In an embodiment, the oxidant-containing gas stream may be oxygen and/or carbon dioxide enriched air containing at least 13% by weight oxygen and/or at least 26% by weight carbon dioxide. In a preferred embodiment, the flow of air and/or carbon dioxide is controlled such that a molar ratio of carbon dioxide to molecular oxygen in the air is at least 2 or at least 2.5.

In one embodiment, the oxidant-containing gas stream is provided by a carbon dioxide containing gas stream and an oxygen-containing gas stream. The carbon dioxide stream and the oxygen-containing gas stream may come from two separate sources. In a preferred embodiment, a majority or substantially all of the carbon dioxide for molten carbonate fuel cell 12 is derived from the hydrocarbon stream comprising hydrocarbons provided to first reformer 14. The carbon dioxide containing gas stream is fed from a carbon dioxide source to cathode inlet 38 through line 44. The carbon dioxide containing gas stream provided to fuel cell 12 may be fed to the same cathode inlet 38 as the oxygen-containing gas stream, or may be mixed with an oxygen-containing gas stream prior to being fed to cathode inlet 38. Alternatively, the carbon dioxide containing gas stream may be provided to cathode 26 through a separate cathode inlet.

In a preferred embodiment, the carbon dioxide stream is provided to cathode 26 of fuel cell 12 from high temperature hydrogen-separation device 18 via lines 48 and 44 as described herein. Oxygen may be provided to cathode 26 of fuel cell 12 via line 44.

Gases fed to the cathode and/or anode, whether one stream or multiple streams, may be heated in heat exchanger 22 or other heat exchangers prior to being fed to cathode 26 and/or anode 24, preferably by exchanging heat with an oxygen-depleted cathode exhaust stream exiting cathode exhaust 40 and connected to heat exchanger 22 through line 50.

In the process of the invention, the hydrogen-containing gas stream(s) are mixed with an oxidant at one or more of the anode electrodes of molten carbonate fuel cell 12 to generate electricity. The oxidant is preferably carbonate derived from the reaction of carbon dioxide and oxygen flowing through cathode 26 and conducted across the electrolyte of the fuel cell. The hydrogen-containing gas stream and the oxidant are mixed in the anode at the one or more anode electrodes of fuel cell 12 by feeding the hydrogen-containing gas stream and/or the oxidant-containing gas stream to the fuel cell at selected independent rates, as discussed in further detail below. The hydrogen-containing gas stream and the oxidant are preferably mixed at the one or more anode electrodes of the fuel cell to generate electricity at an electrical power density of at least 0.1 $W/cm^2$, or at least 0.15 $W/cm^2$, or at least 0.2 $W/cm^2$, or at least 0.3 $W/cm^2$, or at least 0.6 $W/cm^2$ at 1 bara. Higher power densities may be obtained at higher pressures and/or by using enriched oxidant-containing gas streams (for example, enriched air).

Molten carbonate fuel cell 12 is operated at a temperature effective to enable carbonate to traverse the electrolyte portion 28 from cathode 26 to anode 24. Molten carbonate fuel cell 12 may be operated at a temperature from 550° C. to 700° C. or from 600° C. to 650° C. The oxidation of hydrogen with carbonate at the one or more anode electrodes is an exothermic reaction. The heat of reaction generates the heat required to operate molten carbonate fuel cell 12. The temperature at which the molten carbonate fuel cell is operated may be controlled by several factors, including, but not limited to, regulating the feed temperatures and feed flow of the hydrogen-containing gas and the oxidant-containing gas. Since hydrogen utilization is minimized, the excess hydrogen is fed to the system and un-reacted hydrogen can partially cool the molten carbonate fuel cell, by carrying excess heat to the first reformer. Adjusting the flow of the carbon dioxide stream and/or oxidant-containing stream to maintain the molar ratio of carbon dioxide to molecular oxygen at about 2 requires enough oxidant-containing gas to achieve an excess of molecular oxygen of about 1.3 to 2.0 times the quantity need to react with the portion of the hydrogen utilized in the anode. Thus, the excess of oxygen depleted air or oxidant-containing gas, which exits in the cathode exhaust, may carry significant heat from the molten carbonate fuel cell. The temperature of a hydrogen-containing stream described below provided to anode 24 of molten carbonate fuel cell 12 from the high temperature hydrogen-separation device 18 may be reduced by heat recovery (for example, through heat exchanger 22) prior to being provided to the molten carbon fuel cell anode. The temperature of a high-pressure carbon dioxide stream described below provided to cathode 26 of molten carbonate fuel cell 12 from the high temperature hydrogen-separation device 18 may be reduced by heat recovery (for example, through heat exchanger 22) prior to being provided to the molten carbon fuel cell cathode. The temperature of a effluent stream produced from catalytic partial oxidation reformer 20 may be reduced by heat recovery (for example, through heat exchanger 22) prior to being provided to the molten carbon fuel cell cathode. Waste heat from the fuel cell may be used to heat one or more of the streams utilized in the system. If necessary, any supplemental systems for cooling molten carbonate fuels known in the art may be used to control the temperature of the molten carbonate fuel cell.

In an embodiment, the oxidant-containing gas stream(s) fed to the cathode may be heated to a temperature of at least 150° C. or from 150° C. to 350° C. prior to being fed to cathode 26. In an embodiment, when an oxygen-containing gas is used, the temperature of an oxygen-containing gas stream is controlled to a temperature from 150° C. to 350° C.

To initiate operation of fuel cell 12, the fuel cell is heated to its operating temperature—a temperature sufficient to melt the electrolyte salts to allow flow of carbonate ions. As shown in FIG. 1, operation of molten carbonate fuel cell 12 may be initiated by generating a hydrogen-containing gas stream in catalytic partial oxidation reformer 20 and feeding the hydrogen-containing gas stream through lines 52 and 34 to anode 24 of the molten carbonate fuel cell.

A hydrogen-containing gas stream may be generated in catalytic partial oxidation reformer 20 by combusting a portion of a hydrocarbon stream comprising hydrocarbons described below, or a different hydrocarbon stream, for example, a fuel stream enriched in natural gas, and an oxidant-containing gas in catalytic partial oxidation reformer 20 in the presence of a conventional partial oxidation catalyst, where an amount of oxygen in the oxidant-containing gas fed to catalytic partial oxidation reformer 20 is sub-stoichiometric relative to an amount of hydrocarbons in the hydrocarbon stream. The flow of the hydrogen-containing gas stream may be controlled by valve 60.

As shown in FIG. 2, the fuel cell is heated to its operating temperature by generating the hydrogen-containing gas stream in oxidizing unit 20 and feeding the hydrogen-containing gas stream through lines 96, 104, and 34 to anode 24 of the molten carbonate fuel cell. The rate at which the hydrogen-containing gas stream from oxidizing unit 20 is fed to anode 24 via lines 96, 104, is controlled by three-way valve 102. A portion of the heat from hydrogen-containing gas stream may be passed through heat exchanger 98 via line 96 to provide heat to first reformer 14 and/or the hydrocarbon stream comprising hydrocarbons entering the first reformer.

Referring to FIGS. 1 and 2, the fuel fed to catalytic partial oxidation reformer 20 may be a liquid or gaseous hydrocarbon or mixtures of hydrocarbons, and preferably is the same as the hydrocarbon stream comprising hydrocarbons provided to first reformer 14. The fuel may be fed to catalytic partial oxidation reformer 20 via line 62. In an embodiment, fuel fed to catalytic partial oxidation reformer 20 is enriched in natural gas and/or hydrogen from hydrogen source 64.

The oxidant fed to catalytic partial oxidation reformer 20 may be pure oxygen, air, or oxygen enriched air, hereinafter, "oxidant-containing gas." Preferably, the oxidant-containing gas is air. The oxidant should be provided to the catalytic partial oxidation reformer 20 such that an amount of oxygen in the oxidant is in sub-stoichiometric amounts relative to the hydrocarbons fed to the catalytic partial oxidation reforming. In a preferred embodiment, the oxidant-containing gas is fed to catalytic partial oxidation reformer 20 through line 56 from oxidant source 42. Valve 58 may control the rate at which oxidant-containing gas (air) is fed to catalytic partial oxidation reformer 20 and/or cathode 26 of fuel cell 12. In an embodiment, the oxidant-containing gas entering catalytic partial oxidation reformer 20 may be heated by exchanging heat with an oxygen-depleted cathode exhaust stream exiting cathode exhaust 40.

In catalytic partial oxidation reformer 20, a hydrogen-containing gas stream is formed by combusting the hydrocarbons and oxidant in the presence of a conventional partial oxidation catalyst, where the oxidant is in a sub-stoichiometric amount relative to the hydrocarbons. The hydrogen-containing gas stream formed by contact of the hydrocarbons and the oxidant in catalytic partial oxidation reformer 20 contains compounds that may be oxidized in fuel cell anode 24 by contact with carbonate ions at one or more of the anode electrodes. The hydrogen-containing gas stream from catalytic partial oxidation reformer 20 preferably does not contain compounds that oxidize the one or more anode electrodes in anode 24 of fuel cell 12.

The hydrogen-containing gas stream formed in catalytic partial oxidation reformer 20 is hot, and may have a temperature of at least 700° C., or from 700° C. to 1100° C., or from 800° C. to 1000° C. Use of the hot hydrogen gas stream from catalytic partial oxidation reformer 20 to initiate start up of molten carbonate fuel cell 12 is preferred in the process of the invention since it enables the temperature of the fuel cell to be raised to the operating temperature of the fuel cell almost instantaneously. In an embodiment, heat may be exchanged in heat exchanger 22 between the hot hydrogen-containing gas from catalytic partial oxidation reformer 20 and an oxidant-containing gas fed to cathode 26 when initiating operation of the fuel cell.

Referring to FIG. 1, the flow of the hot hydrogen-containing gas stream from the catalytic partial oxidation reformer 20 into fuel cell 12 may be adjusted using valve 60, while feeding the hydrogen-containing gas stream into the anode 24 by opening valve 36. Valve 60 may be closed after flow of a hydrogen-containing gas stream from high temperature hydrogen-separation device 18 is initiated while decreasing or stopping the flow of hydrocarbon feed through line 62 and oxidant feed through line 56 to catalytic partial oxidation reformer 20.

Referring to FIG. 2, the flow of the hot hydrogen-containing gas stream from the catalytic partial oxidation reformer 20 into fuel cell 12 by way of line 96 may be adjusted using three-way metering valve 102, while feeding the hydrogen-containing gas stream into the anode 24 by opening valve 36. Valve 102 may be closed after generating a hydrogen-containing gas stream from high temperature hydrogen-separation device 18 while decreasing or stopping the flow of hydrocarbon feed through line 62 and oxidant feed through line 56 to catalytic partial oxidation reformer 20. Continuous operation of the fuel cell may then be conducted according to the process of the invention.

Three-way metering valve 102 controls the flow of effluent from catalytic partial oxidation reformer 20 to anode 24 or cathode 26. During start-up, effluent from catalytic partial oxidation reformer 20 is rich in hydrogen so the effluent is directed to anode 24 via line 104 after passing through heat exchanger 98 via line 96. After start-up is initiated and if catalytic partial oxidation reformer 20 is used to produce carbon dioxide for cathode 26, metering valve 102 controls the flow of effluent from catalytic partial oxidation reformer 20 to cathode 26 via line 96.

In another embodiment, operation of the fuel cell may be initiated with a hydrogen start-up gas stream from hydrogen source 64 that may be passed through a start-up heater (not shown) to bring the fuel cell up to its operating temperature prior to introducing the hydrogen-containing gas stream via line 66 into fuel cell 12, as shown in FIG. 1. Hydrogen source 64 may be a storage tank capable of receiving hydrogen from the high temperature hydrogen-separation device 18. The hydrogen source may be operatively connected to the fuel cell to permit introduction of the hydrogen start-up gas stream into the anode of the molten carbonate fuel cell. The start-up heater may indirectly heat the hydrogen start-up gas stream to a temperature from 750° C. to 1000° C. Alternatively, the start-up heater may provide hydrogen by incomplete burning of the hydrogen from hydrogen source 64 provided to the heater. The start-up heater may be an electrical heater or may be a combustion heater. Upon reaching the operating temperature of the fuel cell, the flow of the hydrogen start-up gas stream into the fuel cell may be shut off by a valve, and the hydrogen-containing gas stream may be introduced into the fuel cell by opening a valve from the hydrogen generator to the anode of the fuel cell to start the operation of the fuel cell.

In one embodiment, first reformer 14 includes a catalytic partial oxidation reformer that is used to provide hydrogen to the molten carbonate fuel cell on start-up. First reformer 14 may include one or more catalyst beds that allow the first reformer to be used for autothermal reforming and then for steam reforming once the molten carbonate fuel cell has reached operating temperature.

Once fuel cell 12 has started operating, cathode 26 and anode 24 emit exhaust. Exhaust from cathode 26 and anode 24 is hot and the heat from the exhaust may be thermally integrated with other units to produce a thermally integrated system that produces all the fuel (hydrogen) and oxidant (carbonate ion) necessary for the operation of the fuel cell.

As shown in FIGS. 1 and 2, the processes described herein utilize a system that includes thermally integrated hydrogen-separation separation device 18, molten carbonate fuel cell 12, first reformer 14, and second reformer 16 and, in some embodiments, catalytic partial oxidizing reformer 20. High temperature hydrogen-separation device 18 comprises one or more high temperature hydrogen-separating membranes 68 and is operatively coupled to molten carbonate fuel cell 12. High temperature hydrogen-separation device 18 provides a hydrogen-containing gas stream containing primarily molecular hydrogen to anode 24 of fuel cell 12, while the exhaust from the anode of molten carbonate fuel cell 12 is provided to first reformer 14. First reformer 14 and second reformer 16 may be one unit or two units operatively coupled. First reformer 14 and second reformer 16 may include one or more reforming zones. In an embodiment, first reformer 14 and second reformer 16 are one unit that includes a first reforming zone and a second reforming zone.

A hydrocarbon stream comprising hydrocarbons is provided to first reformer 14 via line 62 and the anode exhaust is mixed with the hydrocarbons. The process is thermally integrated, where heat to drive the endothermic reforming reactions in first reformer 14 is provided from the anode exhaust of the exothermic molten carbonate fuel cell 12 directly within the first reformer and/or with the hydrocarbons in the hydrocarbon stream provided to the first reformer. In an embodiment, a portion of the heat from the anode exhaust is mixed with the hydrocarbons in a heat exchanger in or operatively coupled to the first reformer. As shown in FIG. 2, additional heat to first reformer 14 may be provided from a hot effluent stream from catalytic partial oxidation reformer 20. In first reformer 14, at least a portion of the hydrocarbons from the hydrocarbon stream are cracked and/or reformed to produce a feed stream that is provided to second reformer 16 via line 70.

Second reformer 16 is operatively coupled to high temperature hydrogen-separation device 18 and the high temperature hydrogen-separation device produces at least a portion, a majority, at least 75% by volume, or at least 90% by volume, or substantially all of the hydrogen-containing gas that enters anode 24 of molten carbonate fuel cell 12. High temperature hydrogen-separation device may be positioned after second reformer 16 and before molten carbonate fuel cell 12. In a preferred embodiment, high temperature hydrogen-separation device 18 is a membrane separation unit that is part of second reformer 16. The high temperature hydrogen-separation device 18 separates hydrogen from the reformed product. The separated hydrogen is provided to anode 24 of molten carbonate fuel cell 12.

In an embodiment of the process, the hydrocarbon stream contains one or more of any vaporizable hydrocarbon that is liquid at 20° C. at atmospheric pressure (optionally oxygenated) that is vaporizable at temperatures up to 400° C. at atmospheric pressure. Such hydrocarbons may include, but are not limited to, petroleum fractions such as naphtha, diesel, jet fuel, gas oil, and kerosene having a boiling point range of 50° C. to 360° C. In an embodiment, the hydrocarbon stream is decane. In a preferred embodiment, the hydrocarbon stream is diesel fuel. In an embodiment, the hydrocarbon stream contains hydrocarbons having a carbon number ranging from five to twenty-five. In a preferred embodiment, the hydrocarbon stream contains at least 0.5, or at least 0.6, or at least 0.7, or at least 0.8 mole fraction of hydrocarbons containing at least five, or at least six, or at least seven carbon atoms.

The hydrocarbon stream may optionally contain some hydrocarbons that are gaseous at 25° C. such as methane, ethane, propane, or other compounds containing from one to four carbon atoms that are gaseous at 25° C. The hydrocarbon stream may be treated prior to being fed to first reformer 14 and/or heated in heat exchanger 72 to remove any materials that may poison any catalyst used in the first reformer for the conversion of higher molecular weight hydrocarbons to lower molecular weight hydrocarbons. For example, the hydrocarbon stream may have undergone a series of treatments to remove metals, sulfur, and/or nitrogen compounds.

In an embodiment of the process, the hydrocarbon stream is mixed with natural gas that contains at least 20% by volume, or at least 50% by volume, or at least 80% by volume carbon dioxide. If necessary, the natural gas has been treated to remove hydrogen sulfide. In an embodiment, a hydrocarbon stream that has at least 20% by volume of carbon dioxide, at least 50% by volume carbon dioxide, or at least 70% by volume of carbon dioxide may be used as a fuel source.

In an embodiment, the hydrocarbon stream may be provided to first reformer 14 at a temperature of at least 150° C., preferably from 200° C. to 400° C., where the hydrocarbon stream may be heated to a desired temperature in heat exchangers as described below. The temperature that the hydrocarbon stream is fed to first reformer 14 may be selected to be as high as possible to vaporize the hydrocarbons without producing coke. The temperature of the hydrocarbon stream may range from 150° C. to 400° C. Alternatively, but less preferred, the hydrocarbon stream may be fed directly to first reformer 14 at a temperature of less than 150° C., for example without heating the hydrocarbon stream, provided the sulfur content of the hydrocarbon stream is low.

As shown in FIG. 1, the hydrocarbon stream may be passed through one or more heat exchangers 72 to heat the feed. The hydrocarbon stream, may be heated by exchanging heat with cathode exhaust stream separated from cathode 26 of molten carbonate fuel cell 12 and fed to heat exchanger 72 via line 74. The rate at which the cathode exhaust stream is fed to heat exchangers 72 and 22 may be controlled by adjusting metering valves 76 and 78.

In a preferred embodiment, separated anode exhaust stream is fed into one or more reforming zones of first reformer 14 via line 80. The rate at which the anode exhaust stream is fed to the first reformer 14 may be controlled by adjusting metering valve 82. The temperature of the anode exhaust may range from about 500° C. to about 700° C., and preferably is about 650° C.

The anode exhaust stream includes hydrogen, steam, and reaction products from the oxidation of fuel fed to anode 24 of fuel cell 12 and unreacted fuel. In an embodiment, the anode exhaust stream contains at least 0.5, or at least 0.6, or at least 0.7 mole fraction hydrogen. The hydrogen in the anode exhaust stream fed to first reformer 14 or a reforming zone of the first reformer may help prevent the formation of coke in the first reformer. In an embodiment, the anode exhaust stream contains from 0.0001 to about 0.3, or from 0.001 to about 0.25, or from 0.01 to about 0.2 mole fraction water (as steam). In addition to hydrogen, steam present in the anode exhaust stream fed to first reformer 14 or a reforming zone of the first reformer also may help prevent the formation of coke in the first reformer. The anode exhaust stream may contain enough hydrogen to inhibit coking and enough steam to reform most of the hydrocarbons in the hydrocarbon stream to methane, hydrogen, and carbon monoxide. Thus, less steam may be needed for reforming hydrocarbons in the first reformer and/or second reformer.

Optionally, steam may be fed to first reformer 14 or a reforming zone of the first reformer via line 84 to be mixed with the hydrocarbon stream in the first reformer or the reforming zone of the first reformer. Steam may be fed to first reformer 14 or a reforming zone of the first reformer to inhibit or prevent coke formation in the first reformer and, optionally, to be utilized in reforming reactions effected in the first reformer. In an embodiment, steam is fed to first reformer 14 or reforming zone of the first reformer at a rate where the molar ratio of total steam added to the first reformer is at least twice, or at least three times, the moles of carbon in the hydrocarbon stream added to the first reformer. The total steam added to the first reformer may include steam from the anode exhaust, steam from an external source, for example, through line 84, or mixtures thereof. Providing a molar ratio of at least 2:1, or at least 2.5:1, or at least 3:1, or at least 3.5:1 of steam to carbon in the hydrocarbon stream in first reformer 14 a or reforming zone of the first reformer may be useful to inhibit coke formation in the first reformer. Metering valve 86 may be used to control the rate that steam is fed to first reformer 14 or a reforming zone of the first reformer through line 84. Since the anode exhaust includes a significant amount of hydrogen, less coking tends to occur during reforming. Thus, the amount of optional steam fed to first reformer 14 may be significantly less than the amount of steam used for conventional reforming units.

Steam may be fed to first reformer 14 at a temperature of at least 125° C., preferably from 150° C. to 300° C., and may have a pressure from 0.1 MPa to 0.5 MPa, preferably having a pressure equivalent to or below the pressure of the anode exhaust stream fed to the first reformer as described herein. The steam may be generated by heating high-pressure water, having a pressure of at least 1.0 MPa, preferably 1.5 MPa to 2.0 MPa, by passing the high-pressure water via line 88 through heat exchanger 90. The high-pressure water is heated to form high-pressure steam by exchanging heat with cathode exhaust fed after cathode exhaust feed has passed through heat exchanger 72 via line 74. Alternatively, the cathode exhaust may be fed directly to heat exchanger 90 (not shown) or to one or more heat exchangers. Upon exiting heat exchanger 90 or the final heat exchanger if more than one heat exchanger is utilized, the high-pressure steam may then be fed to line 84 via line 92. The high-pressure steam may be depressurized to the desired pressure by expanding the high-pressure steam through an expander, then feeding to it to the first reformer. Alternatively, steam may be generated for use in the first reformer 14 by feeding low-pressure water through the one or more heat exchangers 90 and passing the resulting steam into the first reformer.

Optionally, high-pressure steam that is not utilized in first reformer 14 or second reformer 16 may be expanded through other power devices such as a turbine (not shown) together with any non-utilized high-pressure carbon dioxide stream, or, optionally, without the high-pressure carbon dioxide stream. Power sources may be used to generate electricity and/or in addition to electricity generated by the fuel cell 12. Power generated by the power sources and/or the fuel cell may be used to power compressor 94 and/or any other compressors used in the process of the invention.

The hydrocarbon stream, optional steam, and the anode exhaust stream are mixed and contacted with a reforming catalyst in first reformer 14 or a reforming zone of the first reformer at a temperature effective to vaporize any hydrocarbons not in vapor form and to crack the hydrocarbons to form the feed.

The reforming catalyst may be a conventional reforming catalyst, and may be any known catalyst in the art. Typical reforming catalysts, which can be used include, but are not limited to, Group VIII transition metals, particularly nickel and a support or substrate that is inert under high temperature reaction conditions. Suitable inert compounds for use as a support for the high temperature reforming/hydrocracking catalyst include, but are not limited to, α-alumina and zirconia.

In a preferred embodiment, the hydrocarbon stream, the anode exhaust, and optional steam are mixed and contacted with a catalyst at a temperature from about 500° C. to about 650° C. or from about 550° C. to 600° C. with all the heat necessary for the reforming reaction supplied by the anode exhaust. In an embodiment, the hydrocarbon stream, optional steam, and anode exhaust stream are mixed and contacted with a catalyst at a temperature of at least 400° C., or in a range from 450° C. to 650° C., or from 500° C. to 600° C.

Heat supplied from the anode exhaust stream fed from the exothermic molten carbonate fuel cell 12 to first reformer 14 or a reforming zone of the first reformer drives the endothermic cracking and reforming reactions in the first reformer. The anode exhaust stream fed from molten carbonate fuel cell 12 to first reformer 14 and/or a reforming zone of the first reformer is very hot, having a temperature of at least 500° C., typically having a temperature from 550° C. to 700° C., or from 600° C. to 650° C. The transfer of thermal energy from molten carbonate fuel cell 12 to first reformer 14 or a reforming zone of the first reformer is extremely efficient since thermal energy from the fuel cell is contained in the anode exhaust stream, and is transferred to the mixture of hydrocarbon stream, optional steam, and anode exhaust stream in first reformer 14 or a reforming zone of the first reformer by directly mixing the anode exhaust stream with the hydrocarbon stream and steam.

In a preferred embodiment of the process described herein, the anode exhaust stream provides at least 99%, or substantially all, of the heat required to produce the feed from the mixture of the hydrocarbon stream, the optional steam, and the anode exhaust stream. In a particularly preferred embodiment, no heat source other than the anode exhaust stream is provided to first reformer 14 to convert the hydrocarbon stream to the feed.

In an embodiment, the pressure at which the anode exhaust stream, the hydrocarbon stream, and the optional steam are contacted with the reforming catalyst in first reformer 14 may range from 0.07 MPa to 3.0 MPa. If high-pressure steam is not fed to the first reformer 14, the anode exhaust stream, the hydrocarbon stream, and optional low-pressure steam may be contacted with the reforming catalyst in the first reformer at a pressure at the low end of the range, typically from 0.07 MPa to 0.5 MPa, or from 0.1 MPa to 0.3 MPa. If high-pressure steam is fed to first reformer 14, the anode exhaust stream, the hydrocarbon stream, and the steam may be contacted with the reforming catalyst in at the higher end of the pressure range, typically from 1.0 MPa to 3.0 MPa, or from 1.5 MPa to 2.0 MPa.

Referring to FIG. 2, first reformer 14 may be heated to temperatures higher than 630° C. or from 650° C. to 900° C., or from 700° C. to 800° C. by exchanging heat with effluent from catalytic partial oxidation reformer 20 via line 96. Line 96 is operatively coupled to heat exchanger 98. Heat exchanger 98 may be a part of line 96. Heat exchanger 98 may be in first reformer 14 or connected to the first reformer such that heat may be exchanged with the hydrocarbon stream entering the first reformer. The rate at which the effluent from catalytic partial oxidation reformer 20 is fed first reformer 14 may be controlled by adjusting metering valve 100 and three-way metering valve 102.

Contacting the hydrocarbon stream, steam, catalyst, and the anode exhaust stream in first reformer 14 at a temperature of at least 500° C., or from 550° C. to 950° C., or from 600° C. to 800° C., or from 650° C. to 750° C., may crack and/or reform at least a portion of the hydrocarbons and form the feed. Cracking and/or reforming of hydrocarbons in the hydrocarbon stream reduces the number of carbon atoms in hydrocarbon compounds in the hydrocarbon stream, thereby producing hydrocarbon compounds having reduced molecular weight. In an embodiment, the hydrocarbon stream may comprise hydrocarbons containing at least 5, or at least 6, or at least 7 carbon atoms that are converted to hydrocarbons useful as feed to second reformer 16 containing at most 4, or at most 3, or at most 2 carbon atoms. In an embodiment, the hydrocarbons in the hydrocarbon stream may be reacted in first reformer 14 or a reforming zone of the first reformer such that the feed produced from the first reformer may be comprised of not more than 0.1, or not more than 0.05, or not more than 0.01 mole fraction of hydrocarbons with four carbon atoms or more. In an embodiment, hydrocarbons in the hydrocarbon stream may be cracked and/or reformed such that at least 0.7, or at least 0.8, or at least 0.9, or at least 0.95 mole fraction of the resulting hydrocarbons in the feed produced from the hydrocarbons in hydrocarbon stream is methane. In an embodiment, cracking and/or reforming of the hydrocarbons in the hydrocarbon stream produces a feed that has an average carbon number of hydrocarbons in the feed is at most 1.3, at most 1.2, or at most 1.1.

As noted above, hydrogen and steam from the anode exhaust stream and optional steam added to first reformer 14 inhibit the formation of coke in the first reformer as hydrocarbons are cracked to form the feed. In a preferred embodiment, the relative rates that the anode exhaust stream, the hydrocarbon stream, and the steam are fed to first reformer 14 are selected so the hydrogen and steam in the anode exhaust stream and the steam added to the first reformer via line 84 prevent the formation of coke in the first reformer.

In an embodiment, contacting the hydrocarbon stream, steam, and anode exhaust with the reforming catalyst in first reformer 14 at a temperature of at least 500° C., or from 550° C. to 700° C., or from 600° C. to 650° C., may also effect at least some reforming of the hydrocarbons in the hydrocarbon stream and feed produced within first reformer 14 to produce hydrogen and carbon oxides, particularly carbon monoxide. The amount of reforming may be substantial, where the feed resulting from both cracking and reforming in first reformer 14 or reforming zone of the first reformer may contain at least 0.05, or at least 0.1, or at least 0.15 mole fraction carbon monoxide.

The temperature and pressure conditions in first reformer 14 or a reforming zone of the first reformer may be selected so the feed produced in the first reformer comprises light hydrocarbons that are gaseous at 20° C., typically containing 1 to 4 carbon atoms. In a preferred embodiment, the hydrocarbons in the feed produced by the first reformer, hereinafter "steam reforming feed," are comprised of at least 0.6, or at least 0.7, or at least 0.8, or at least 0.9 mole fraction methane. The steam reforming feed also comprises hydrogen from the anode exhaust stream and, if further reforming is effected in the first reformer, from reformed hydrocarbons. The steam reforming feed also comprises steam from the anode exhaust stream and, optionally, from the reformer steam feed. If substantial reforming is effected in first reformer 14 or a reforming zone of the first reformer, the feed produced from the first reformer provided to second reformer 16 may comprise carbon monoxide in addition to carbon dioxide.

In the process of the invention, the steam reforming feed is provided from first reformer 14 to second reformer 16, which is operatively connected to the first reformer through line 70. The steam reforming feed exiting first reformer 14 may have a temperature of from 500° C. to 650° C. or from 550° C. to 600° C. The temperature of the steam reforming feed exiting first reformer 14 may be lowered prior to being fed to second reformer 16 by exchanging heat in one or more heat exchangers 90 prior to being fed to second reformer 16. Optionally, the steam reforming feed is not cooled prior to entering the second reformer. In embodiments when first reformer 14 is heated by other sources (for example as shown in FIG. 2, steam and/or heat from catalytic partial oxidation reformer 20) the feed exiting the first reformer may have a temperature of from 650° C. to 950° C., or from 700° C. to 900° C., or from 750° C. to 800° C.

The steam reforming feed may be cooled by exchanging heat with water fed into the system, cooling the feed, and producing steam that may be fed to the first reformer 14 as described above. If more than one heat exchanger 90 is utilized, the steam reforming feed and water/steam may be fed in series to each of the heat exchanger, preferably in a countercurrent flow to cool the feed and to heat the water/steam. The steam reforming feed may be cooled to a temperature of from 150° C. to 650° C., or from 150° C. to 300° C., or from 400° C. to 650° C., or from 450° C. to 550° C.

The cooled steam reforming feed may be fed from heat exchanger 90 to compressor 94, or, in another embodiment, may be fed directly to second reformer 16. Alternatively, but less preferably, the steam reforming feed exiting first reformer 14 or a reforming zone of the first reformer may be fed to compressor 94 or second reformer 16 without cooling. Compressor 94 is a compressor capable of operating at high temperatures, and preferably is a commercially available StarRotor compressor. The steam reforming feed may have a pressure of at least 0.5 MPa and a temperature from 400° C. to 800° C., preferably from 400° C. to 650° C. The steam reforming feed may be compressed by compressor 94 to a pressure of at least 0.5 MPa, or at least 1.0 MPa, or at least 1.5 MPa, or at least 2 MPa, or at least 2.5 MPa, or at least 3 MPa, to maintain sufficient pressure in reforming zone 108 of second reformer 16. In an embodiment, the steam reforming feed is compressed to a pressure of from 0.5 MPa to 6.0 MPa prior to providing the feed stream to the second reformer.

The optionally compressed, optionally cooled steam reforming feed comprising hydrogen, light hydrocarbons, steam, and, optionally, carbon monoxide, is fed to second reformer 16. The steam reforming feed may have a pressure of at least 0.5 MPa and a temperature from 400° C. to 800° C., preferably from 400° C. to 650° C. In an embodiment, temperature of the steam reforming feed produced from first reformer 14 may be increased after exiting compressor 94, if necessary, by circulating a portion of the feed through heat exchangers 90 and/or 72.

Optionally, additional steam may be added into reforming zone 108 of the second reformer 16 for mixing with the steam reforming feed produced by the first reformer, if necessary for reforming the feed. In a preferred embodiment, the additional steam may be added by injecting high-pressure water from the water inlet line 88 into compressor 94 through line 110 for mixing with the feed as the feed is compressed in the compressor. In an embodiment (not shown), high-pressure water may be injected into the feed by mixing the high-pressure water and feed in heat exchanger 90. In another embodiment (not shown), high-pressure water may be injected into the feed in line 110 either before or after passing the feed to heat exchanger 90 or before or after passing the feed to the compressor 94. In an embodiment, high-pressure water may be injected into line 70, or into compressor 94 or in heat exchanger 90, where either the compressor or the heat exchanger are not included in the system.

The high-pressure water is heated to form steam by mixing with the steam reforming feed, and the steam reforming feed is cooled by mixing with the water. The cooling provided to the steam reforming feed by the water injected therein may eliminate or reduce the need for heat exchanger 90 preferably limiting the number of heat exchangers used to cool the steam reforming feed to at most one.

Alternatively, but less preferred, high-pressure steam may be injected into reforming zone 108 of second reformer 16 or into line 70 to the second reformer to be mixed with the steam reforming feed. The high-pressure steam may be steam produced by heating high-pressure water injected into the system through water inlet line 88 in heat exchanger 90 by exchanging heat with the feed exiting first reformer 14. The high-pressure steam may be fed to second reformer 16 through line 112. Metering valve 114 may be used to control the flow of steam to the second reformer. The high-pressure steam may have a pressure similar to that of the feed being fed to the second reformer. Alternatively, the high-pressure steam may be fed to line 70 to be mixed with the feed prior to the feed being fed to compressor 94 so the mixture of steam and feed may be compressed together to a selected pressure. The high-pressure steam may have a temperature from 200° C. to 500° C.

The rate at which the high-pressure water or high-pressure steam is fed into the system may be selected and controlled to provide an amount of steam to first reformer 14 and/or second reformer 16 effective to optimize reactions in the reformers to produce a hydrogen-containing gas stream. The rate at which steam, other than steam in the anode exhaust stream, is provided to first reformer 14 may be controlled by adjusting metering valves 116 and 118, which control the rate water is fed to the system, or by adjusting metering valves 86, 120, and 114, which control the rates at which steam is fed to first reformer 14 second reformer 16. Steam may be supplied to additional components in the system such as, for example, a turbine.

If high-pressure water is injected into second reformer 16, metering valves 114 and 120 may be adjusted to control the rate the water is injected into the second reformer through line 112. If high-pressure steam is injected into second reformer 16 or into line 70, metering valves 114, 116, and 118 may be adjusted to control the rate the steam is injected into second reformer 16 or into line 70. The flow of steam may be adjusted to provide a molar ratio of at least 2:1, or at least 2.5:1, or at least 3:1, or at least 3.5:1 of steam to carbon.

The steam reforming feed produced by the first reformer and, optionally, additional steam are fed into reforming zone 108 of second reformer 16. The reforming zone may, and preferably does, contain a reforming catalyst therein. The reforming catalyst may be a conventional steam reforming catalyst, and may be known in the art. Typical steam reforming catalysts, which can be used include, but are not limited to, Group VIII transition metals, particularly nickel. It is often desirable to support the reforming catalysts on a refractory substrate (or support). The support, if used, is preferably an inert compound. Suitable inert compounds for use as a support contain elements of Group III and IV of the Periodic Table, such as, for example the oxides or carbides of Al, Si, Ti, Mg, Ce, and Zr.

The steam reforming feed and, optionally additional steam, are mixed and contacted with the reforming catalyst in the reforming zone 108 at a temperature effective to form a reformed product gas containing hydrogen and carbon oxides. The reformed product gas may be formed by steam reforming the hydrocarbons in the feed. The reformed product gas may also be formed by water-gas shift reacting steam and carbon monoxide in the feed and/or produced by steam reforming the feed. In an embodiment, second reformer 16 may act more as a water-gas shift reactor if a substantial amount of reforming was effected in first reformer 14 or a reforming zone of the first reformer and the steam reforming feed contains substantial amounts of carbon monoxide. The reformed product gas comprises hydrogen and at least one carbon oxide. In an embodiment, the reformed product gas comprises gaseous hydrocarbons, hydrogen and at least one carbon oxide. Carbon oxides that may be in the reformed product gas include carbon monoxide and carbon dioxide.

In an embodiment, heat from effluent from catalytic partial oxidation reformer 20 may be heat exchanged with the steam reforming feed stream being provided to and/or in reforming zone 108. A temperature of the effluent from catalytic partial oxidation reformer 20 may range from 750° C. to 1050° C., or from 800° C. to 1000° C., or from 850° C. to 900° C. Heat from the effluent may heat reforming zone 108 of second reformer 16 to a temperature from about 500° C. to about 850° C., or from about 550° C. to 700° C. A temperature in reforming zone 108 of second reformer 16 may be sufficient to reform substantially all, or all, of the feed from first reformer 14 to produce a reformed product gas that comprises hydrogen and at least one carbon oxide.

The reformed product gas may enter high temperature hydrogen-separating device 18, which is operatively coupled to second reformer 16. As shown in FIGS. 1 and 2, high temperature hydrogen-separating device 18 is part of second reformer 16. As shown in FIG. 3, high temperature hydrogen-separating device 18 is separate from second reformer 16 and is operatively coupled to second reformer via line 122.

High temperature hydrogen-separating device 18 may include one or more high temperature tubular hydrogen-separation membranes 68. Membranes 68 may be located in the reforming zone 108 of second reformer 16 and positioned so that the feed and the reformed product gas may contact the membranes 68. Hydrogen may pass through membrane wall (not shown) of membranes 68 to hydrogen conduit 124 located within membranes 68. The membrane wall of each respective membrane separates hydrogen conduit 124 from gaseous communication with non-hydrogen compounds of the reformed product gas, feed, and steam in reforming zone 108 of second reformer 16. The membrane wall is selectively permeable to hydrogen, elemental and/or molecular, so that hydrogen in reforming zone 108 may pass through the membrane wall of membrane 68 to hydrogen conduit 124 while other gases in the reforming zone are prevented from passing to the hydrogen conduit by the membrane wall. Hydrogen flux across high temperature hydrogen-separating device 18 may be increased or decreased by adjusting the pressure in second reformer 16. The pressure in second reformer 16 may be controlled by the rate at which the anode exhaust stream is fed to first reformer 14.

Referring to FIG. 3, feed from second reformer 16 is fed to high temperature hydrogen-separating device 18 via line 122. High temperature hydrogen-separation device 18 may comprise a member that is selectively permeable to hydrogen, either in molecular or elemental form. In a preferred embodiment, the high temperature hydrogen-separation device comprises a membrane that is selectively permeable to hydrogen. In an embodiment, the high temperature hydrogen-separation device comprises a tubular membrane coated with palladium or a palladium alloy that is selectively permeable to hydrogen.

The gas stream that enters high temperature hydrogen-separation device 18 via line 122 may include hydrogen, carbon oxides, and hydrocarbons. The gas stream may contact tubular hydrogen-separation membrane(s) 68 and hydrogen may pass through a membrane wall to hydrogen conduit 124 located within membranes 68. The membrane wall separates hydrogen conduit 124 from gaseous communication with non-hydrogen compounds, and is selectively permeable to hydrogen, elemental and/or molecular, so that hydrogen in the entering gas may pass through the membrane wall to hydrogen conduit 124 while other gases are prevented by the membrane wall from passing to the hydrogen conduit.

High temperature tubular hydrogen-separation membrane(s) 68 in FIGS. 1 and 2 may include a support coated with a thin layer of a metal or alloy that is selectively permeable to hydrogen. The support may be formed of a ceramic or metallic material that is porous to hydrogen. Porous stainless steel or porous alumina is preferred materials for the support of the membrane 68. The hydrogen selective metal or alloy coated on the support may be selected from metals of Group VIII, including, but not limited to Pd, Pt, Ni, Ag, Ta, V, Y, Nb, Ce, In, Ho, La, Au, and Ru, particularly in the form of alloys. Palladium and platinum alloys are preferred. A particularly preferred membrane 68 used in the present process has a very thin film of a palladium alloy having a high surface area coating a porous stainless steel support. Membranes of this type can be prepared using the methods disclosed in U.S. Pat. No. 6,152,987. Thin films of platinum or platinum alloys having a high surface area would also be suitable as the hydrogen selective material.

Pressure within reforming zone 108 of second reformer 16 is maintained at a level significantly above the pressure within the hydrogen conduit 124 of tubular membrane 68 so that hydrogen is forced through the membrane wall from reforming zone 108 of second reformer 16 into hydrogen conduit 124. In an embodiment, hydrogen conduit 124 is maintained at or near atmospheric pressure, and the reforming zone 108 is maintained at a pressure of at least 0.5 MPa, or at least 1.0 MPa, or at least 2 MPa, or at least 3 MPa. As noted above, reforming zone 108 may be maintained at such elevated pressures by compressing the feed from first reformer 14 with compressor 94 and injecting the mixture of feed at high-pressure into reforming zone 108.

Alternatively, reforming zone 108 may be maintained at such high-pressures by mixing high-pressure steam with the feed as described above and injecting the high-pressure mixture into reforming zone 108 of second reformer 16. Alternatively, the reforming zone 108 may be maintained at such high-pressures by mixing high-pressure steam with the hydrocarbon stream in first reformer 14 or a reforming zone of the first reformer and injecting a high-pressure feed produced in the first reformer into second reformer 16 either directly or through one or more heat exchangers 90. Reforming zone 108 of second reformer 16 may be maintained at a pressure of at least 0.5 MPa, or at least 1.0 MPa, or at least 2.0 MPa, or at least 3.0 MPa.

The temperature at which the steam reforming feed, and optionally additional steam, is/are mixed and contacted with the reforming catalyst in reforming zone 108 of second reformer 16 is at least 400° C., and preferably may range from 400° C. to 650° C., most preferably in a range of from 450° C. to 550° C. Typical steam reformers are run at temperatures of 750° C. or higher to obtain equilibrium conversions that sufficiently high. In the present process, the reforming reaction is driven towards the production of hydrogen in the reformer operating temperature range of 400° C. to 650° C. by continuous removal of hydrogen from reforming zone 108 into hydrogen conduit 124 of membranes 68, and thence removed from second reformer 16. In this way, the present process may obtain nearly complete conversion of reactants to hydrogen without equilibrium limitations. An operating temperature of 400° C. to 650° C. favors the shift reaction as well, converting carbon monoxide and steam to more hydrogen, which is then removed from reforming zone 108 into hydrogen conduit 124 through the membrane wall of the membrane(s). Nearly complete conversion of hydrocarbons and carbon monoxide to hydrogen and carbon dioxide by the reforming and water-gas shift reactions may be achieved in second reformer 16 since equilibrium is never reached due to the continuous removal of hydrogen from the second reformer.

In an embodiment, the steam reforming feed provided from first reformer 14 and/or a reforming zone of the first reformer to the second reformer 16 supplies heat to drive the reactions in the second reformer. The steam reforming feed produced from first reformer 14 and/or a reforming zone of the first reformer to second reformer 16 may contain sufficient thermal energy to drive the reactions in the second reformer, and may have a temperature from 400° C. to 950° C. The thermal energy of the steam reforming feed produced from first reformer 14 and/or a reforming zone of the first reformer may be in excess of the thermal energy needed to drive the reactions in second reformer 16, and, as described above, the feed may be cooled to a temperature from 400° C. to less than 600° C. in heat exchanger 90 and/or by injecting water into the feed prior to the feed being fed to second reformer 16. Having a feed at or near the temperatures required for second reformer 16 may be preferable so that 1) temperature within second reformer 16 may be adjusted to favor the production of hydrogen in the water-gas shift reaction; 2) membrane(s) 68 lifespan may be extended; and 3) performance of compressor 94 is improved. The transfer of thermal energy from first reformer 14 to second reformer 16 is extremely efficient since thermal energy from the first reformer is contained in the feed, which is intimately involved in the reactions within the second reformer.

The hydrogen-containing stream, is formed from the reformed product gas in high temperature hydrogen-separation device 18 by selectively passing hydrogen through the membrane wall of hydrogen-separation membrane(s) 68 into the hydrogen conduit 124 to separate the hydrogen-containing gas stream from the reformed product gas. The hydrogen-containing gas stream may contain a very high concentration of hydrogen, and may contain at least 0.9, or at least 0.95, or at least 0.98 mole fraction hydrogen.

The hydrogen-containing gas stream may be separated from the reformed product gas at a relatively high rate due to the high flux of hydrogen through the hydrogen-separation membrane(s) 68. In an embodiment, the temperature at which the hydrogen is separated from the reformed product gas through the hydrogen-separation membrane(s) 68 is at least 300° C., or from about 350° C. to about 600° C., or from 400° C. to 500° C. Hydrogen is passed at a high flux rate through the hydrogen-separation membrane(s) 68 since hydrogen is present in second reformer 16 at a high partial pressure. The high partial pressure of hydrogen in second reformer 16 is due to 1) significant quantities of hydrogen in the anode exhaust stream fed to the first reformer 14 and passed to the second reformer in the feed; 2) hydrogen produced in the first reformer and fed to the second reformer; and 3) hydrogen produced in the second reformer by the reforming and shift reactions. No sweep gas is necessary to assist removing hydrogen from hydrogen conduit 124 and out of high temperature hydrogen-separation device 18 due to the high rate that hydrogen is separated from the reformed product.

As shown in FIGS. 1-2, the hydrogen-containing gas stream exits high temperature hydrogen-separation device 18 and enters anode 24 of molten carbonate fuel cell 12 via hydrogen conduit 124 through lines 126 and 34 into anode inlet 30. Alternatively, the hydrogen-containing gas is fed directly to anode inlet 30 via line 126. The hydrogen gas stream provides hydrogen to anode 24 for electrochemical reaction with an oxidant at one or more anode electrodes along the anode path length in fuel cell 12. A partial pressure of the molecular hydrogen entering second reformer 16 is higher than a partial pressure of the molecular hydrogen in the hydrogen-containing gas stream exiting high temperature hydrogen-separation device 18. The difference in partial pressure between second reformer 16 and the partial pressure of the molecular hydrogen in the hydrogen-containing gas stream exiting high temperature hydrogen-separation device 18 drives the reforming reaction and/or water-gas shift reactions to make more hydrogen. In some embodiments, a sweep gas, for example steam, may be injected into the hydrogen conduit to sweep hydrogen from the inner portion of the membrane wall member into the hydrogen conduit, thereby increasing the rate hydrogen may be separated from the reforming zone by the hydrogen-separation membrane.

Prior to feeding the hydrogen-containing gas stream to the anode 24, the hydrogen-containing gas stream, or a portion thereof, may be fed to heat exchanger 72 to heat the hydrocarbon stream and cool the hydrogen gas stream via line 128. The hydrogen-containing gas stream may have a temperature from 400° C. to 650° C., typically a temperature from 450° C. to 550° C., upon exiting high temperature hydrogen-separation device 18. The pressure of the hydrogen-containing gas exiting high temperature hydrogen-separation device 18 may have a pressure of about 0.1 MPa, or from 0.01 MPa to 0.5 MPa, or from 0.02 MPa to 0.4 MPa or from 0.3 to 0.1 MPa. In a preferred embodiment, a hydrogen-containing gas stream exiting high temperature hydrogen-separation device 18 has a temperature of about 450° C. and a pressure of about 0.1 MPa. The pressure and temperature of the hydrogen-containing gas stream exiting high temperature hydrogen-separation device 18 may be suitable for directly feeding the hydrogen-containing gas stream directly to anode inlet 30 of molten carbonate fuel cell 12.

The hydrocarbon stream may optionally be heated by exchanging heat with the hydrogen gas stream in heat exchanger 72, and optionally by exchanging heat with the carbon dioxide gas stream as described below. The hydrogen gas stream fed to anode 24 of molten carbonate fuel cell 12 may be cooled to a temperature of at most 400° C., or at most 300° C., or at most 200° C., or at most 150° C., or temperatures from 20° C. to 400° C., or from 25° C. to 250° C. to control the operating temperature of the molten carbonate fuel cell within a range from 600° C. to 700° C., in combination with selecting and controlling the temperature of the oxidant-containing gas stream fed to cathode 26 of molten carbonate fuel cell 12. The hydrogen-containing gas stream, or a portion thereof, may typically be cooled to a temperature from 200° C. to 400° C. by exchanging heat with the hydrocarbon stream in heat exchanger 72. Optionally, the hydrogen gas stream, or a portion thereof, may be cooled further by passing the hydrogen gas stream, or the portion thereof, from heat exchanger 72 to one or more additional heat exchangers (not shown) to exchange further heat with the hydrocarbon stream or with a water stream in each of the one or more additional heat exchangers. If additional heat exchangers are employed in the system, the hydrogen gas stream, or the portion thereof, may be cooled to a temperature of from 20° C. to 200° C., preferably from 25° C. to 100° C. In an embodiment, a portion of the hydrogen gas stream may be cooled in heat exchanger 72 and, optionally one or more additional heat exchangers, and a portion of the hydrogen gas stream may be fed to anode 24 of molten carbonate fuel cell 12 without being cooled in a heat exchanger, where the combined portions of the hydrogen gas stream may be fed to the anode of the fuel cell at a temperature of at most 400° C., or at most 300° C., or at most 200° C., or at most 150° C., or temperatures from 20° C. to 400° C., or from 25° C. to 100° C.

The flow rate of the hydrogen gas stream, or portion thereof, to heat exchangers 72, 22, and, optionally to one or more additional heat exchangers, may be selected and controlled to control the temperature of the hydrogen gas stream fed to anode 24 of molten carbonate fuel cell 12. The flow rate of the hydrogen gas stream, or a portion thereof, to heat exchanger 22, and the optional additional heat exchanger(s) may be selected and controlled by adjusting metering valves 36, 130, and 132. Metering valves 36 and 130 may be adjusted to control the flow of the hydrogen gas stream, or a portion thereof, to anode 24 of molten carbonate fuel cell 12 through line 126 without cooling the hydrogen gas stream, or the portion thereof. Metering valve 130 may also control the flow of the hydrogen gas stream, or a portion thereof, to heat exchanger 22. Metering valve 132 may be adjusted to control the flow of the hydrogen gas stream, or a portion thereof, to heat exchanger 72 and any optional additional heat exchangers through line 128. Metering valves 130 and 132 may be adjusted in coordination to provide the desired degree of cooling to the hydrogen gas stream prior to feeding the hydrogen gas stream to anode 24 of molten carbonate fuel cell 12. In an embodiment, metering valves 130 and 132 may be adjusted in coordination automatically in response to feedback measurements of the temperature of the anode exhaust stream and/or the cathode exhaust stream exiting fuel cell 12. The hydrogen gas stream provides hydrogen to the anode 24 for electrochemical reaction with an oxidant at one or more anode electrodes along the anode path length in fuel cell 12. The rate the hydrogen gas stream is fed to anode 24 of molten carbonate fuel cell 12 may be selected by selecting the rate that the feed is fed to second reformer 16, which in turn may be selected by the rate that the hydrocarbon stream is fed to first reformer 14, which may be controlled by adjusting the hydrocarbon stream inlet valve 106.

Any portion of the hydrogen-containing gas stream fed to heat exchanger 72, and optionally the additional heat exchanger(s), may be fed from the heat exchanger, or through the last additional heat exchanger used to cool the hydrogen-containing gas stream with any portion of the hydrogen gas stream routed around the heat exchangers to the anode of the molten carbonate fuel cell. In an embodiment, the combined portions of the hydrogen-containing gas stream or the hydrogen-containing gas stream exiting high temperature hydrogen-separation device 18 may be compressed in a compressor (not shown) to increase the pressure of the hydrogen gas stream, and then the hydrogen gas stream may be fed to the anode. In an embodiment, the hydrogen gas stream may be compressed to a pressure from 0.15 MPa to 0.5 MPa, or from 0.2 MPa to 0.3 MPa, or up to 0.7 MPa, or up to 1 MPa. All or part of the energy required to drive the compressor may be provided by expansion of a high-pressure carbon dioxide stream, formed as described below, and/or the high-pressure steam through one or more turbines.

Alternatively, the rate that the hydrogen gas stream is fed to anode 24 of molten carbonate fuel cell 12 may be selected by controlling metering valves 36 and 134 in a coordinated manner. Metering valve 36 may be adjusted to increase or decrease the flow of the hydrogen gas stream into anode 24. Metering valve 134 may be adjusted to increase or decrease flow of the hydrogen gas stream to hydrogen source 64. Metering valves 36 and 134 may be controlled in a coordinated manner so that a selected rate of the hydrogen gas stream may be fed to anode 24 of molten carbonate fuel cell 12 through line 34 while a portion of the hydrogen gas stream in excess of the amount of hydrogen gas stream required to provide the selected rate may be fed to the hydrogen source 64 through line 136.

A hydrogen-depleted reformed product gas stream may be removed from high temperature hydrogen-separation device 18 via line 48, where the hydrogen-depleted reformed product gas stream may include unreacted feed and gaseous non-hydrogen reformed products in the reformed product gas. The non-hydrogen reformed products and unreacted feed may include carbon dioxide, water (as steam), and small amounts of carbon monoxide and unreacted hydrocarbons. Small amounts of hydrogen may also be contained in the hydrogen-depleted reformed product gas stream as well.

In an embodiment, the hydrogen-depleted reformed product gas stream exiting high temperature hydrogen-separation device 18 may be a carbon dioxide gas stream containing at least 0.8, or at least 0.9, or at least 0.95, or at least 0.98 mole fraction carbon dioxide on a dry basis. The carbon dioxide gas stream is a high-pressure gas stream, having a pressure of at least 0.5 MPa, or at least 1 MPa, or at least 2 MPa, or at least 2.5 MPa. Hereafter, the hydrogen-depleted reformed product gas stream will be referred to as the high-pressure carbon dioxide gas stream. The temperature of the high-pressure carbon dioxide gas stream exiting hydrogen-separation device 18 is at least 400° C. or typically between 425° C. and 600° C. or between 450° C. and 550° C.

The high-pressure carbon dioxide gas stream may exit high temperature hydrogen-separation device 18 and be fed to cathode 26 of fuel cell 12 via lines 48 and 44. As shown, the high-pressure carbon dioxide gas stream passes through heat exchanger 22 and may be utilized to heat the oxidant gas stream. In an embodiment, a portion of the carbon dioxide stream is mixed directly with the oxidant gas stream entering cathode 26 via line 44.

In a preferred embodiment, the high-pressure carbon dioxide gas stream is fed to catalytic partial oxidation reformer 20 via line 48. In catalytic partial oxidation reformer 20, residual hydrocarbons (for example, methane, ethane, and propane) in the carbon dioxide stream are combusted in the presence of oxygen or air fed from oxidant source 42 via line 56 to form a hot effluent combustion stream that passes through heat exchanger 22 via line 138 and is fed to cathode 26 via line 44. In an embodiment, the combustion stream is fed directly to cathode 26 via lines 138 and 44. An amount of molecular oxygen in the oxidant-containing stream fed to catalytic partial oxidation reformer 20 is at least 0.9 times but not more than 1.1 times the stoichiometric amount required for complete combustion of hydrocarbons in the carbon dioxide stream.

Hot combustion stream may include a substantial amount of carbon dioxide, but may also include nitrogen gas and water. The hot combustion stream exiting catalytic partial oxidation reformer 20 may have a temperature ranging from at least 750° C. to 1050° C., or from 800° C. to 1000° C., or from 850° C. to 900° C. Heat from the hot combustion gas may be exchanged with hydrogen-containing gas stream in heat exchanger 22 and/or oxidant-containing gas stream in the heat exchanger. As shown in FIG. 2, at least a portion of the heat from the combustion stream exiting catalytic partial oxidation reforming 20 may be exchanged with first reformer 14 in heat exchanger 98 via line 96.

In an embodiment, hot combustion gas may be fed directly to cathode exhaust inlet 38. A temperature of the oxidant-containing gas may be adjusted so that a temperature of the cathode exhaust stream exiting the fuel cell ranges from 550° C. to 700° C. The oxidant-containing gas temperature may be adjusted to a temperature from 150° C. to 450° C. through cooling and/or heating in heat exchanger 22. Flow of the oxidant-containing gas stream from high temperature hydrogen-separation device 18 to heat exchanger 22 and/or catalytic partial oxidation reformer 20 may be controlled by adjusting metering valves 46, 58, and 140.

The hot combustion gas stream may contain significant amounts of water as steam as it exits catalytic partial oxidation reforming 20. In an embodiment, the steam may be removed from the hot combustion gas stream by cooling the hot combustion gas stream in heat exchanger 22 and/or in heat exchanger 72 and, if necessary, one or more additional heat exchangers (not shown) and condensing water from the stream.

The high-pressure carbon dioxide gas stream from high temperature hydrogen-separation device 18 may be utilized to heat the hydrocarbon stream by passing the carbon dioxide containing gas stream through line 142 to heat exchanger 72 while feeding the hydrocarbon stream into the heat exchanger 72 through the hydrocarbon stream line 62. Flow of the high-pressure carbon dioxide stream from high temperature hydrogen-separation device 18 to heat exchanger 72 may be controlled by adjusting metering valve 144. Metering valve 144 may be adjusted to control the flow of the carbon dioxide stream to heat exchanger 72 to heat the hydrocarbon stream to a selected temperature. The hydrocarbon stream may be heated to a temperature such that the hydrocarbon stream has a temperature of at least 150° C., or from 200° C. to 500° C. as the hydrocarbon stream is fed to first reformer 14.

Metering valves 46, 58, and 140, may be adjusted automatically by a feedback mechanism, where the feedback mechanism may measure the temperature of the cathode exhaust stream exiting fuel cell 12 and/or the temperature of the hydrocarbon stream entering first reformer 14 and adjust metering valves 46, 58, and 140 to maintain the temperature of the cathode exhaust stream and/or the hydrocarbon stream entering first reformer 14 within set limits while maintaining the internal pressure within second reformer 16 and/or high temperature hydrogen-separation device 18 at a desired level.

The hydrogen gas stream and the oxidant (carbonate)—generated by the reaction of oxygen and carbon dioxide at the cathode—are preferably mixed at the one or more anode electrodes of the fuel cell 12 as described above to generate electricity at an electrical power density of at least 0.1 W/cm$^2$, more preferably at least 0.15 W/cm$^2$, or at least 0.2 W/cm$^2$, or at least 0.3 W/cm$^2$. Electricity may be generated at such electrical power densities by selecting and controlling the rate that the hydrogen gas stream is fed to anode 24 of fuel cell 12 and the rate that the oxidant-containing gas stream is fed to cathode 26 of fuel cell 12. The flow rate of the oxidant-containing gas stream to cathode 26 of fuel cell 12 may be selected and controlled by adjusting oxidant gas inlet valve 46.

As described above, the flow rate of the hydrogen gas stream to anode 24 of fuel cell 12 may be selected and controlled by selecting and controlling the rate that the feed is fed to second reformer 16, which in turn may be selected and controlled by the rate that the hydrocarbon stream is fed to first reformer 14, which may be selected and controlled by adjusting hydrocarbon stream inlet valve 106. Alternatively, as described above, the rate that the hydrogen gas stream is fed to anode 24 of fuel cell 12 may be selected and controlled by controlling metering valves 36, 130, 132, and 134 in a coordinated manner. In an embodiment, metering valves 36, 130, 132, and 134 may be automatically adjusted by a feedback mechanism to maintain a selected flow rate of the hydrogen gas stream to anode 24, where the feedback mechanism may operate based upon measurements of hydrogen content in the anode exhaust stream, or water content in the anode exhaust stream, or the ratio of water formed in the fuel cell relative to hydrogen in the anode exhaust stream.

In the process of the invention, mixing the hydrogen gas stream and the oxidant at the one or more anode electrodes generates water (as steam) by the oxidation of a portion of hydrogen present in the hydrogen gas stream fed to fuel cell 12 with the oxidant. Water generated by the oxidation of hydrogen with an oxidant is swept through anode 24 of fuel cell 12 by the unreacted portion of the hydrogen gas stream to exit anode 24 as part of the anode exhaust stream.

In an embodiment of the process of the invention, the flow rate that the hydrogen gas stream is fed to anode 24 may be selected and controlled so the ratio of amount of water formed in fuel cell 12 per unit of time to the amount of hydrogen in the anode exhaust per unit of time is at most 1.0, or at most 0.75, or at most 0.67, or at most 0.43, or at most 0.25, or at most 0.11. In an embodiment, the amount of water formed in fuel cell 12 and the amount of hydrogen in the anode exhaust may be measured in moles so that the ratio of the amount of water formed in the fuel cell per unit of time to the amount of hydrogen in the anode exhaust per unit of time in moles per unit of time is at most 1.0, or at most 0.75, or at most 0.67, or at most 0.43, or at most 0.25, or at most 0.11. In an embodiment, the flow rate that the hydrogen gas stream is fed to anode 24 may be selected and controlled so the per pass hydrogen utilization rate in fuel cell 12 is less than 50%, or at most 45%, or at most 40%, or at most 30%, or at most 20%, or at most 10%.

In another embodiment of the process of the invention, the flow rate that the hydrogen gas stream is fed to anode 24 may be selected and controlled so the anode exhaust stream contains at least 0.6, or at least 0.7, or at least 0.8, or at least 0.9 mole fraction hydrogen. In an another embodiment, the flow rate that the hydrogen gas stream is fed to anode 24 may be selected and controlled so the anode exhaust stream contains greater than 50%, or at least 60%, or at least 70%, or at least 80%, or at least 90% of the hydrogen in the hydrogen gas stream fed to anode 24.

In some embodiments, the flow rate that the carbon dioxide stream is fed to cathode 26 may be selected and controlled so that the partial pressure of the carbon dioxide in majority of the cathode portion of the molten carbonate fuel cell is higher than a partial pressure of carbon dioxide in a majority of an anode portion of the molten carbonate fuel cell. In an embodiment, the flow rate that the carbon dioxide stream is fed to cathode 26 may be selected and controlled so that the partial pressure of the carbon dioxide in the cathode exhaust stream exiting the fuel cell is greater than the partial pressure of the carbon dioxide in the anode exhaust stream exiting the fuel cell. The flow rate of carbon dioxide is selected and controlled so that the partial pressure of carbon dioxide in at least 75 percent, or at least 95 percent, or substantially all of the cathode portion of the molten carbonate fuel cells is higher than a partial pressure of carbon dioxide in at least 75 percent, 95 percent or substantially all of the anode portion of the molten carbonate fuel cell.

Operating the molten carbonate fuel cell to control the $\Delta P_{CO2}$ at pressures at above 0, at any concentration of air and/or any utilization of hydrogen, may inhibit carbon dioxide starvation of the molten carbonate fuel cell and enhance the cell potential of the molten carbonate fuel cell. The flow rate that the carbon dioxide stream is fed to cathode 26 of molten carbonate fuel cell 12 may be selected and controlled such that the delta in the carbon dioxide partial pressures, as determined by the equation: $(\Delta P_{CO2})=(P_{CO2}{}^c)-(P_{CO2}{}^a)$, is about or above 0 bara, from 0.01 to 0.2 bara, or from 0.05 to 0.15 bara, when the hydrogen utilization is at most 60%, at most 50% or at most 40%, at most 30%, at most 20%, or at most 10% and/or the flow of air is controlled such that a molar ratio of carbon dioxide to molecular oxygen is about 2.

EXAMPLES

Non-restrivtive examples are set forth below.

A UniSim® simulation program (Honeywell) in combination with calculations for cell potential was used to construct a detailed process simulation for the molten carbonate fuel cell systems of the present invention. The UniSim program was used to obtain material balance and energy balance data. The detailed process simulation was repeatedly solved for the different values of hydrogen utilization, and other relevant system parameters. The detailed process simulation output included detailed composition data for all process streams entering and exiting the molten carbonate fuel cell. For high temperature fuel cells, activation losses are small and the cell potential may be obtained over the practical range of current densities by considering only ohmic and electrode losses. As such, the cell potential (V) of a molten carbonate fuel cell is the difference between the open circuit voltage (E) and the losses (iR) as shown in Equation (1).

$$V=E-iR \qquad (1)$$

where V and E have units of volts or millivolts, i is the current density (mA/cm$^2$) and R ($\Omega$cm$^2$) is the combination of Ohmic ($R_{ohm}$), cathode ($_c$) and anode ($_a$) resistance, combining electrolyte, cathode and anode together as shown in Equation (2).

$$R=R_{ohm}+_c+_a \qquad (6)$$

E is obtained from the Nernst equation:

$$E=E^\circ+(RT/2F)\ln(P_{H2}P_{O2}{}^{0.5}/P_{H2O})+(RT/2F)\ln(P_{CO2}{}^c/P_{CO2}{}^a) \qquad (3)$$

Examples 1

The detailed process simulations described above was used to simulate cell voltage versus current density and power density formation for molten carbonate fuel cell systems described herein where the first reformer was heated by the anode exhaust, with no other heating. For example, systems depicted by FIG. 1. The heat for the second reformer was heated by exchange with the hot effluent from the catalytic partial oxidation reformer. The output temperature of the effluent from the catalytic partial oxidation reformer was increased by using the cathode exhaust to preheat the catalytic oxidation reformer air feed.

Example 2

The simulation described above was used to simulate cell voltage versus current density and power density formation for molten carbonate fuel cell systems described herein where the first reformer is heated by anode exhaust and heat from a catalytic partial oxidation reformer. For example, systems depicted in FIG. 2.

For Examples 1 and 2, the molten carbonate fuel cell was operated at a pressure of 1 bara (about 0.1 MPa or about 1 atm) and a temperature of 650° C. The flow of feed to the cathode of the molten carbonate fuel cell was counter current to the flow of feed to the anode. Air was used as the source of oxygen. Values for air were used to produce a molar ratio of carbon dioxide to molecular oxygen of 2 at various hydrogen utilizations. The percent hydrogen utilization for the molten carbonate fuel cell, operating conditions of the first and second reformer, steam to carbon ratios, and percent conversion of benzene to hydrogen for Example 1 and 2 simulations are listed in TABLE 1. R in Equation 2 was obtained from J. Power Sources 2002, 112, pp. 509-518 and assumed to be equal to 0.75 $\Omega$cm$^2$, as The data from for Examples 1 and 2 simulations were compared to literature values for cell voltage, current density, and power density of state of the art molten carbonate fuel cells described by Larmine et al., in "Fuel Cell Systems Explained," 2003, Wiley & Sons, page 199.

TABLE 1

| H$_2$ Utilization, % | Temp., 1$^{st}$ Reformer, ° C. | Temp., 2$^{nd}$ Reformer, ° C. | Pressure, 2$^{nd}$ Reformer, bara | Steam/Carbon Ratio, 1$^{st}$ Reformer | Steam/Carbon Ratio, 2$^{nd}$ Reformer | Conversion of Benzene to Hydrogen % |
|---|---|---|---|---|---|---|
| 20 | 619 | 500 | 15 | 2.5 | 3 | 94 |
| 30 | 591 | 500 | 15 | 2.5 | 3 | 95 |
| 40 | 569 | 500 | 15 | 2.5 | 3 | 96 |
| 50 | 551 | 500 | 15 | 2.5 | 3 | 96 |
| 60 | 536 | 500 | 15 | 2.5 | 3 | 97 |

Figure 4:
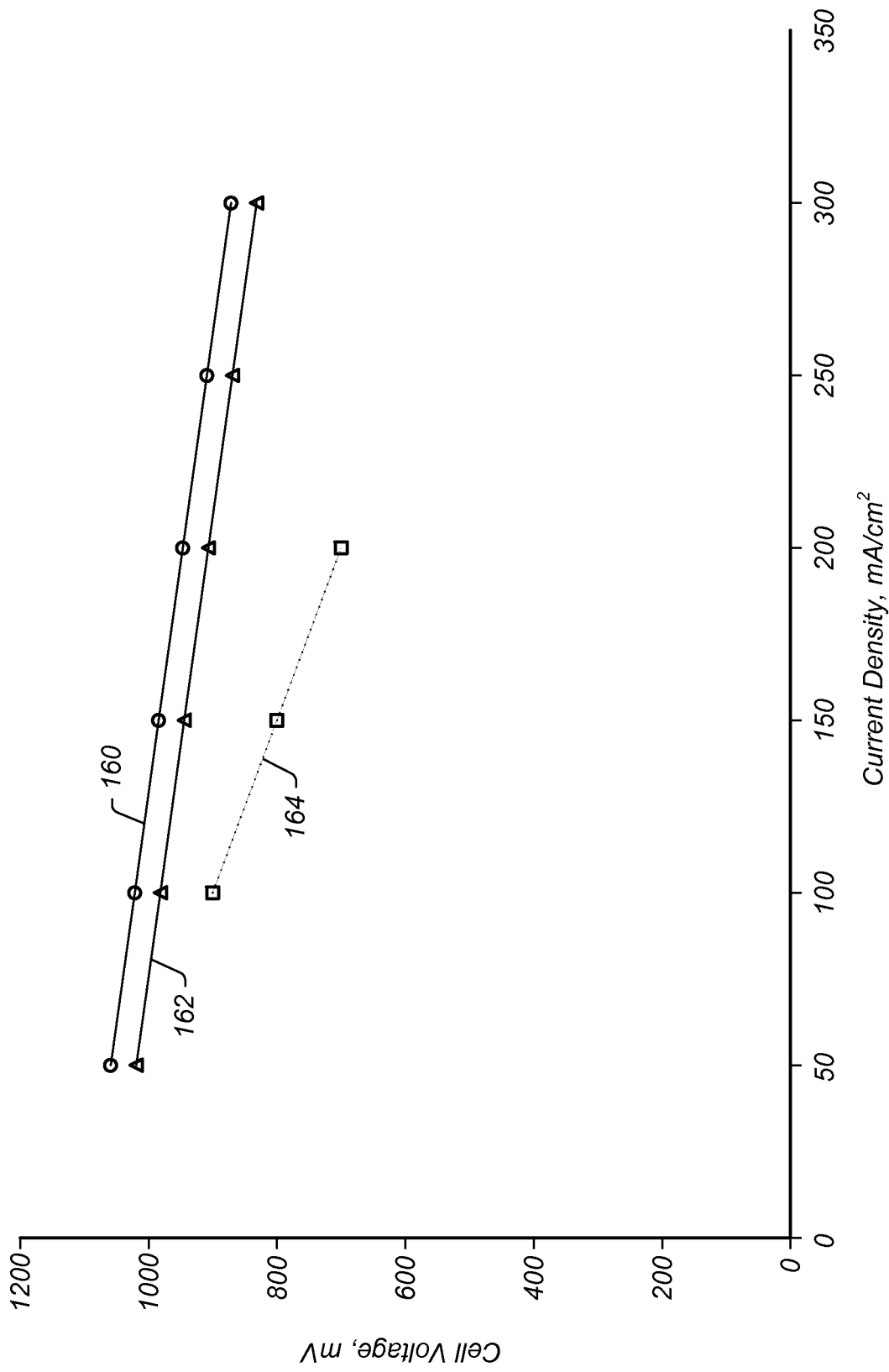
FIG. 4 depicts cell voltage (mV) versus current density ($mA/cm^2$) for embodiments of molten carbonate fuel cell systems operated at 1 bara.

FIG. 4 depicts cell voltage (mV) versus current density (mA/cm$^2$) for the molten carbonate fuel cell systems simulated in Examples 1 and 2 and literature values for a molten carbonate fuel cell having reformate as a feed. The molten carbonate fuel cells were operated at a hydrogen utilization of 20% and 30%. Data line 160 depicts cell voltage (mV) versus current density (mA/cm$^2$) at a hydrogen utilization of 20% for a molten carbonate fuel cell system for Examples 1 and 2. Data line 162 depicts cell voltage (mV) versus current density (mA/cm$^2$) at a hydrogen utilization of 30% for Examples 1 and 2. Data line 164 depicts cell voltage (mV) versus current density (mA/cm$^2$) for state of the art molten carbonate fuel cell systems as described by Larmine et al., in "Fuel Cell Systems Explained," 2003, Wiley & Sons, page 199. As shown in FIG. 4, for a given current density, the cell voltage of the molten carbonate fuel cell systems described herein are higher than the cell voltage of state of the art molten carbonate fuel cell having reformate gas as a feed.

Figure 5:
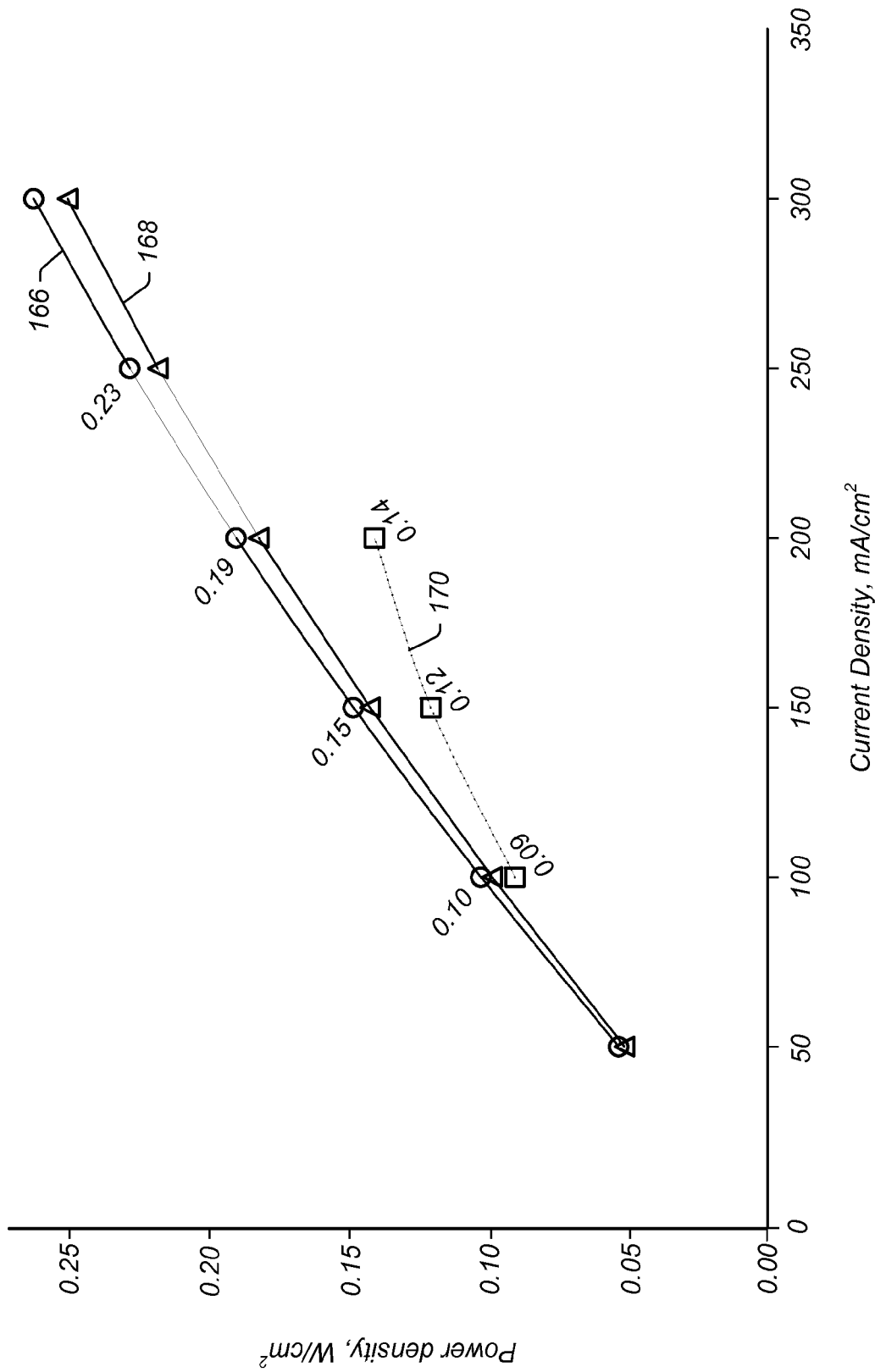
FIG. 5 depicts power density ($W/cm^2$) versus current density for embodiments of molten carbonate fuel cell systems operated at 1 bara.

FIG. 5 depicts power density (W/cm$^2$) vs. current density (mA/cm$^2$) for the molten carbonate fuel cell system simulated in Examples 1 and 2 operated at a hydrogen utilization of 20% and 30%, and literature values for a molten carbonate fuel cell having a reformate gas as a feed. Data line 166 depicts power density (W/cm$^2$) vs. current density (mA/cm$^2$) at a hydrogen utilization of 20% for Examples 1 and 2. Data line 168 depicts power density (W/cm$^2$) vs. current density (mA/cm$^2$) at a hydrogen utilization of 30% for Examples 1 and 2. Data line 170 depicts power density (W/cm$^2$) vs. current density (mA/cm$^2$) for state of the art molten carbonate fuel cell systems as described by Larmine et al., in "Fuel Cell Systems Explained, 2003, Wiley & Sons, page 199. As shown in FIG. 5, for a given current density, the power density of the molten carbonate fuel cell systems described herein are higher than the power density of the molten carbonate fuel cell having reformate gas as a feed.

Figure 6:
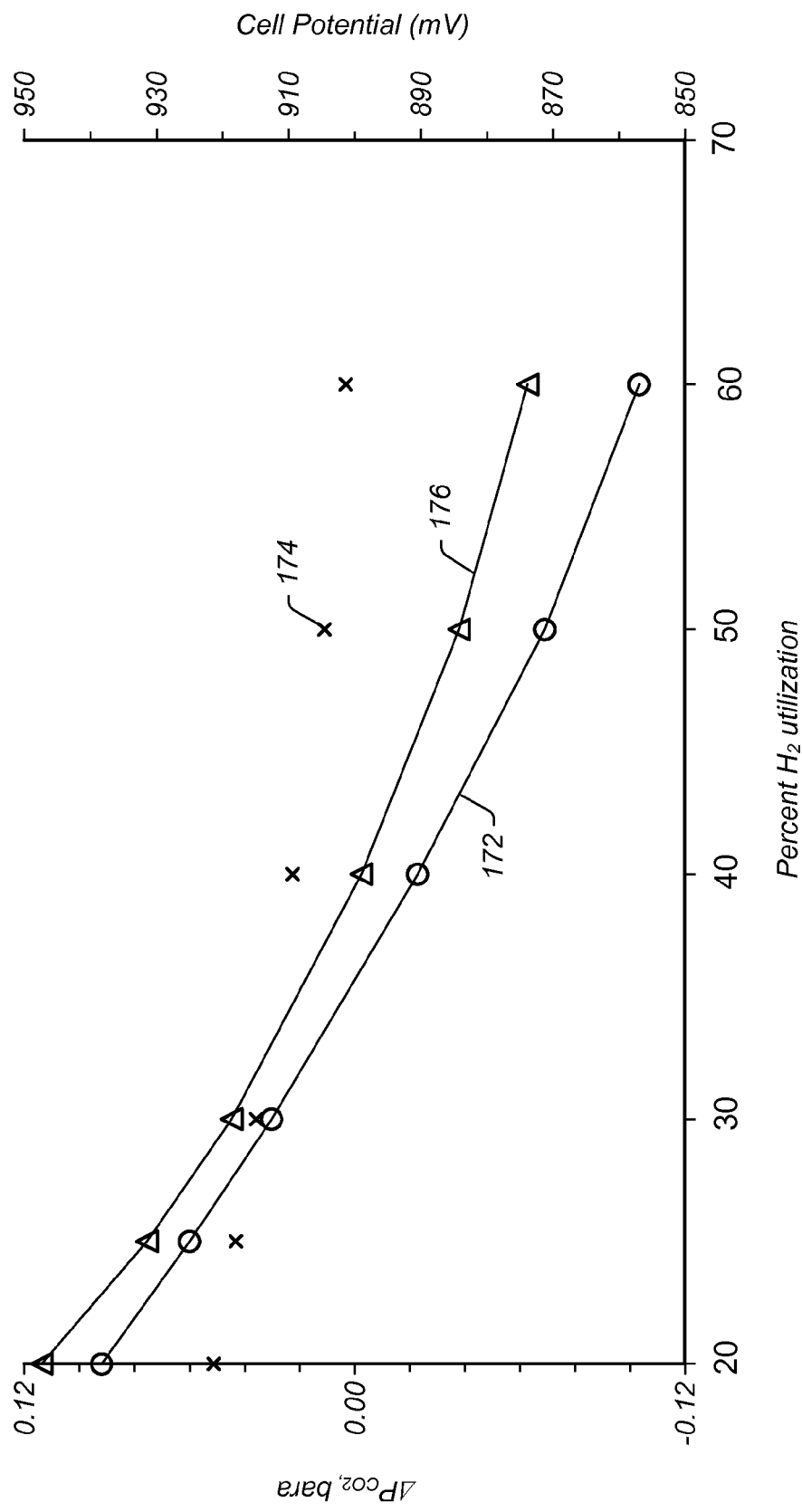
FIG. 6 depicts cell voltage (mV) versus current density ($mA/cm^2$) for various embodiments of molten carbonate fuel cell systems operated at 7 bara.

FIG. 6 depicts excess carbon dioxide ($AP_{CO2}$(bara)), and total fuel cell potential (mV) versus hydrogen utilization for Example 1. Data line 172 represents excess carbon dioxide values (at a given hydrogen utilization and a current density of 200 mA/cm$^2$. Data 174 represents average excess carbon dioxide values at a given hydrogen utilization. Data line 176 represents total cell potential (mV) at given hydrogen utilization as determined from the Nernst equation for the fuel cell. As shown in FIG. 6, $\Delta P_{CO2}$ decreases and cell potential decreases as hydrogen utilization increase, thus operating the molten carbonate fuel system at a hydrogen utilization of less than 50% with carbon dioxide flooding results enhanced cell potential for the molten carbonate fuel cell.

Figure 7:
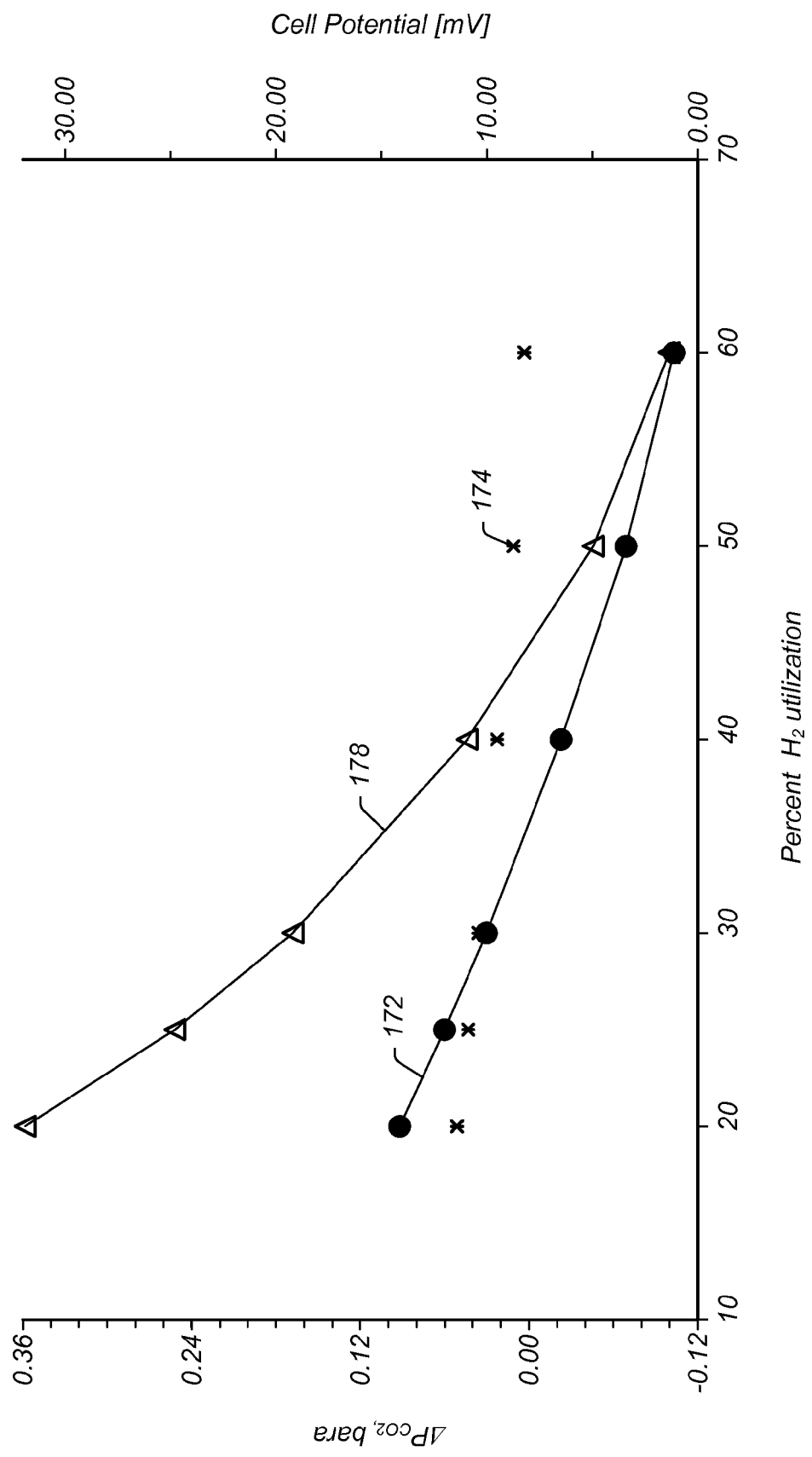
FIG. 7 depicts power density ($W/cm^2$) versus current density ($mA/cm^2$) for embodiments of molten carbonate fuel cell systems operated at 7 bara.

FIG. 7 depicts the carbon dioxide portion of the fuel cell potential (mV) of FIG. 6. Data line 178 represents the carbon dioxide portion of the cell potential (mV) of the fuel cell (for example, the $(RT/2F)\ln(P_{CO2}{}^c/P_{CO2}{}^a)$ portion of the Nernst equation). As shown in FIG. 7, a cell voltage of the fuel cell is boosted when the cathode portion of the fuel cell is flooded with carbon dioxide. For example, at a 20% utilization of hydrogen and operating the fuel cell with an excess carbon dioxide value of about 0.105, 30 mV of the total fuel cell potential was attributed to the excess carbon dioxide.

As shown in FIGS. 6 and 7, cell potential is maximized when the amount of carbon dioxide provided to the fuel cell is in excess ($\Delta P_{CO2}$>0) and the percent hydrogen utilization is low (for example, less than 35%, less than 30%, or less than 20%). Thus, operating the molten carbonate fuel system at a hydrogen utilization of less than 50% and providing an excess of carbon dioxide to a cathode portion of the molten carbonate fuel cell such that a partial pressure of carbon dioxide in a majority of the cathode portion of the molten carbonate fuel cell is higher than a partial pressure of carbon dioxide in a majority of an anode portion of the molten carbonate fuel cell enhances cell potential and, thereby enhances cell voltage of the molten carbonate fuel cell.

Example 3

The simulations described above were used to determine the current density, cell voltage, and power density for a molten carbonate fuel cell operated at 7 bara (about 0.7 MPa or about 7 atm) for a molten carbonate fuel cell system that includes the first reformer heated by anode exhaust (for example, the system depicted in FIG. 1). The molten carbonate fuel cell was operated at a pressure of 7 bara and a temperature of 650° C. at a hydrogen utilization of 20% or 30%. The first reformer had a steam to carbon ratio of 2.5. The temperature of the first reformer was allowed to be varied. The second reformer, in combination with the high temperature hydrogen-separation device, had a temperature of 500° C. and a pressure of 15 bara. Air was used as the source of oxygen. Values for air were used so that the ratio of carbon dioxide to molecular oxygen in the cathode feed was stoichiometric, thus minimizing cathode side concentration polarization. In all cases, the combined carbon conversion values for the system using benzene as the feed was between 93% and 95%. Heat of reaction for the second reformer was supplied by heat integration within the system. R was calculated by calculating the individual terms in Equation 2 above separately by the method described by C. Y. Yuh and J. R. Selman, in J. Electrochem. Soc., Vol. 138, No. 12, Dec. 1991. For Example, 3, R was calculated to be 0.57 Ω·cm$^2$.

Figure 8:
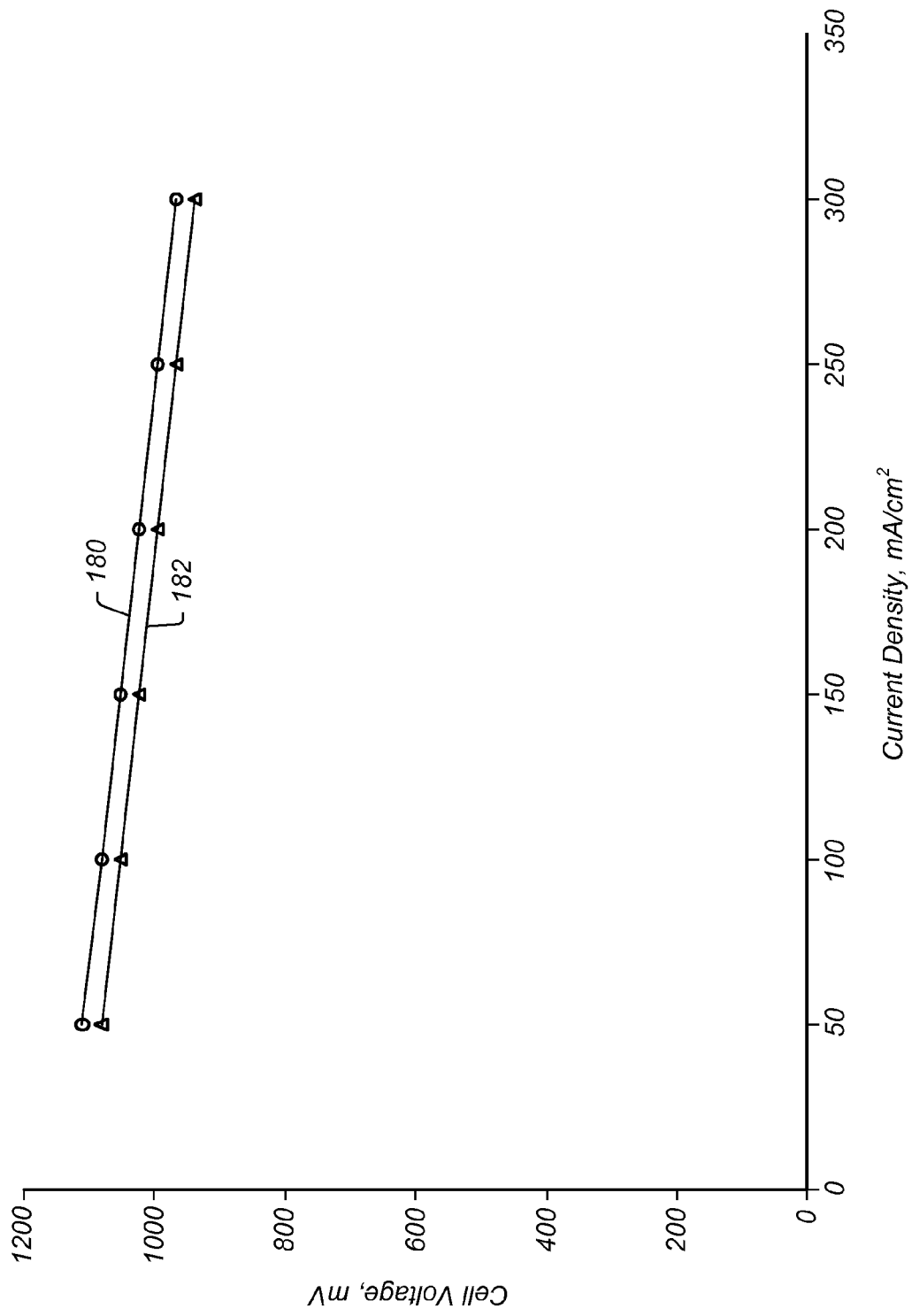
FIG. 8 depicts percent hydrogen utilization vs. $\Delta P_{CO2}$ (bara) for embodiments of operating molten carbonate fuel cells using various amounts of excess air at a given hydrogen utilization.

FIG. 8 depicts cell voltage (mV) versus current density (mA/cm$^2$) for a molten carbonate fuel cell as depicted in FIG. 1. Data line 180 depicts cell voltage (mV) versus current density (mA/cm$^2$) at a hydrogen utilization of 20%. Data line 182 depicts cell voltage (mV) versus current density (mA/cm$^2$) at a hydrogen utilization of 30%. Comparing FIG. 4 with FIG. 8, at a given current density, a higher cell voltage is observed for molten carbonate fuel cell systems operated at pressures of about 7 bara as compared to the cell voltages for molten carbonate fuel cell systems operated at 1 bara.

Figure 9:
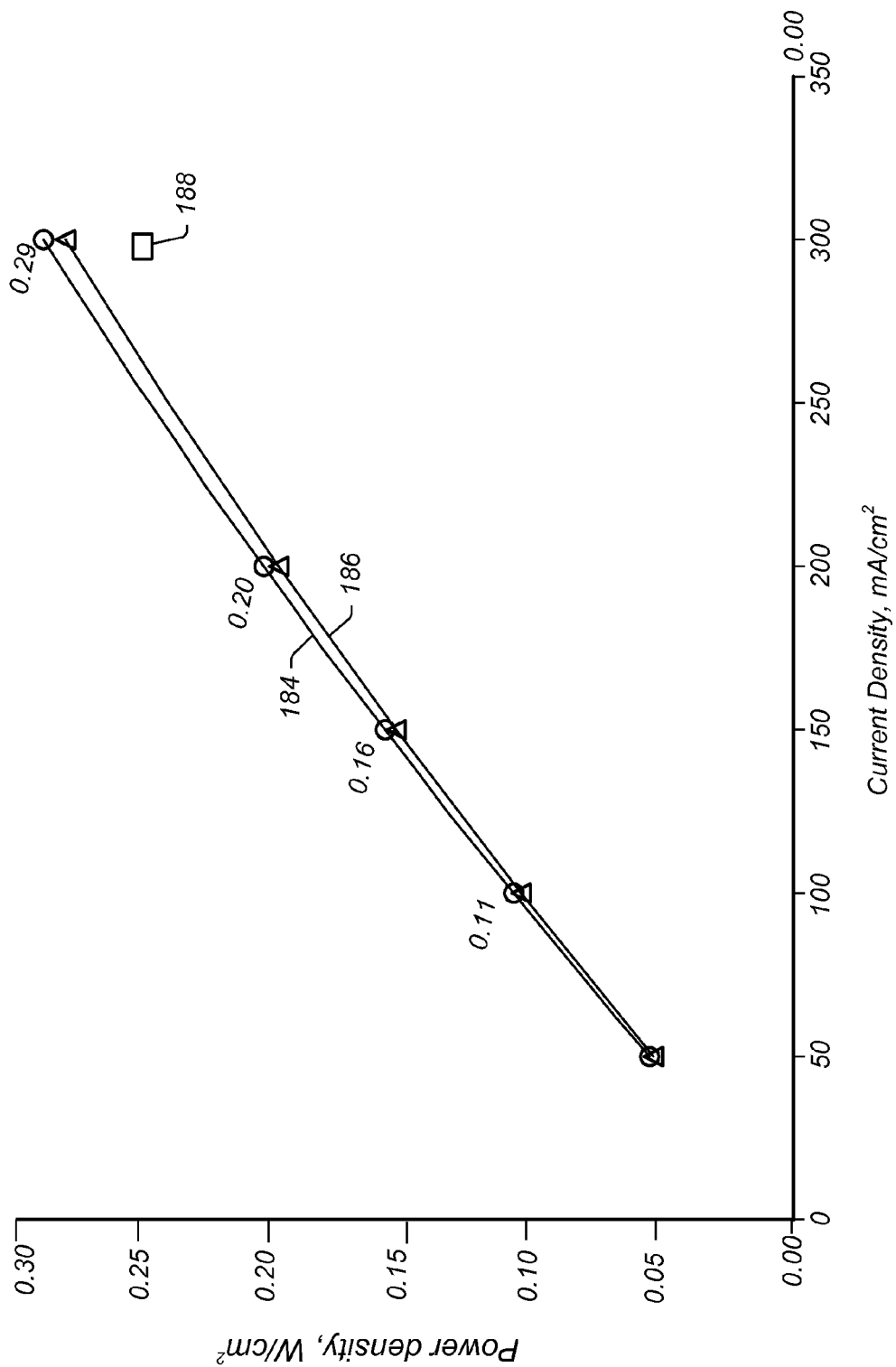
FIG. 9 depicts percent hydrogen utilization vs. $\Delta P_{CO2}$ (bara) for embodiments of operating molten carbonate fuel cells using methane or benzene as a feed source.

FIG. 9 depicts power density (W/cm$^2$) versus current density for a molten carbonate fuel cell system as depicted in FIG. 1 and a state of the molten carbonate fuel cell. Data line 184 depicts power density (W/cm$^2$) versus current density (mA/cm$^2$) at a hydrogen utilization of 20%. Data line 186 depicts power density (W/cm$^2$) versus current density (mA/cm$^2$) at a hydrogen utilization of 30%. Data point 188 depicts power density (W/cm$^2$) versus current density (mA/cm$^2$) for a state of the art molten carbonate fuel cell system as described by J. R. Selman in *Journal of Power Sources*, 2006, pp. 852-857. As shown in FIG. 9, at a current density of about 300 mA/cm$^2$, the power density of the molten carbonate fuel cell systems described herein are higher than the power density of the state of the art molten carbonate fuel cell.

Example 4

The simulation described above was used to compare the use of methane to benzene as fuel sources for molten carbonate fuel cell systems system where the first reformer is heated by the anode exhaust, with no other heating. For example, the system depicted in FIG. 1. Heat of reaction for the second reformer was supplied by heat integration within the system. For these simulations, the molten carbonate fuel cell was operated at a pressure of 1 bara (about 0.1 MPa or about 1 atm) and a temperature of 650° C. Air was used as the source of oxygen. Values for air were used to produce a molar ratio of carbon dioxide to molecular oxygen of 2 at various hydrogen utilizations. The amount of fuel feed to the first reformer was 100 kgmol/hr for benzene and 600 kgmol/hr for methane. The percent hydrogen utilization for the molten carbonate fuel cell, operating conditions of the first and second reformer, and steam to carbon ratios are listed in TABLE 2 for benzene and TABLE 3 for methane. R in Equation 2 was assumed to be equal to 0.75 Ω·cm$^2$, as obtained from J. Power Sources 2002, 112, pp. 509-518.

TABLE 2

| $H_2$ Utilization, % | Temp., $1^{st}$ Reformer, °C. | Temp., $2^{nd}$ Reformer, °C. | Pressure, $2^{nd}$ Reformer, bara | Steam/ Carbon Ratio, $1^{st}$ Reformer | Steam/ Carbon Ratio, $2^{nd}$ Reformer |
|---|---|---|---|---|---|
| 20 | 605 | 500 | 15 | 3.0 | 3 |
| 30 | 574 | 500 | 15 | 3.2 | 3 |
| 40 | 549 | 500 | 15 | 3.3 | 3 |
| 50 | 527 | 500 | 15 | 3.3 | 3 |

TABLE 3

| $H_2$ Utilization, % | Temp., $1^{st}$ Reformer, °C. | Temp., $2^{nd}$ Reformer, °C. | Pressure, $2^{nd}$ Reformer bara | Steam/ Carbon Ratio, $1^{st}$ Reformer | Steam/ Carbon Ratio, $2^{nd}$ Reformer |
|---|---|---|---|---|---|
| 20 | 624 | 500 | 15 | 1.9 | 3 |
| 30 | 596 | 500 | 15 | 2.0 | 3 |
| 40 | 574 | 500 | 15 | 2.1 | 3 |
| 50 | 555 | 500 | 15 | 2.1 | 3 |

Figure 10:
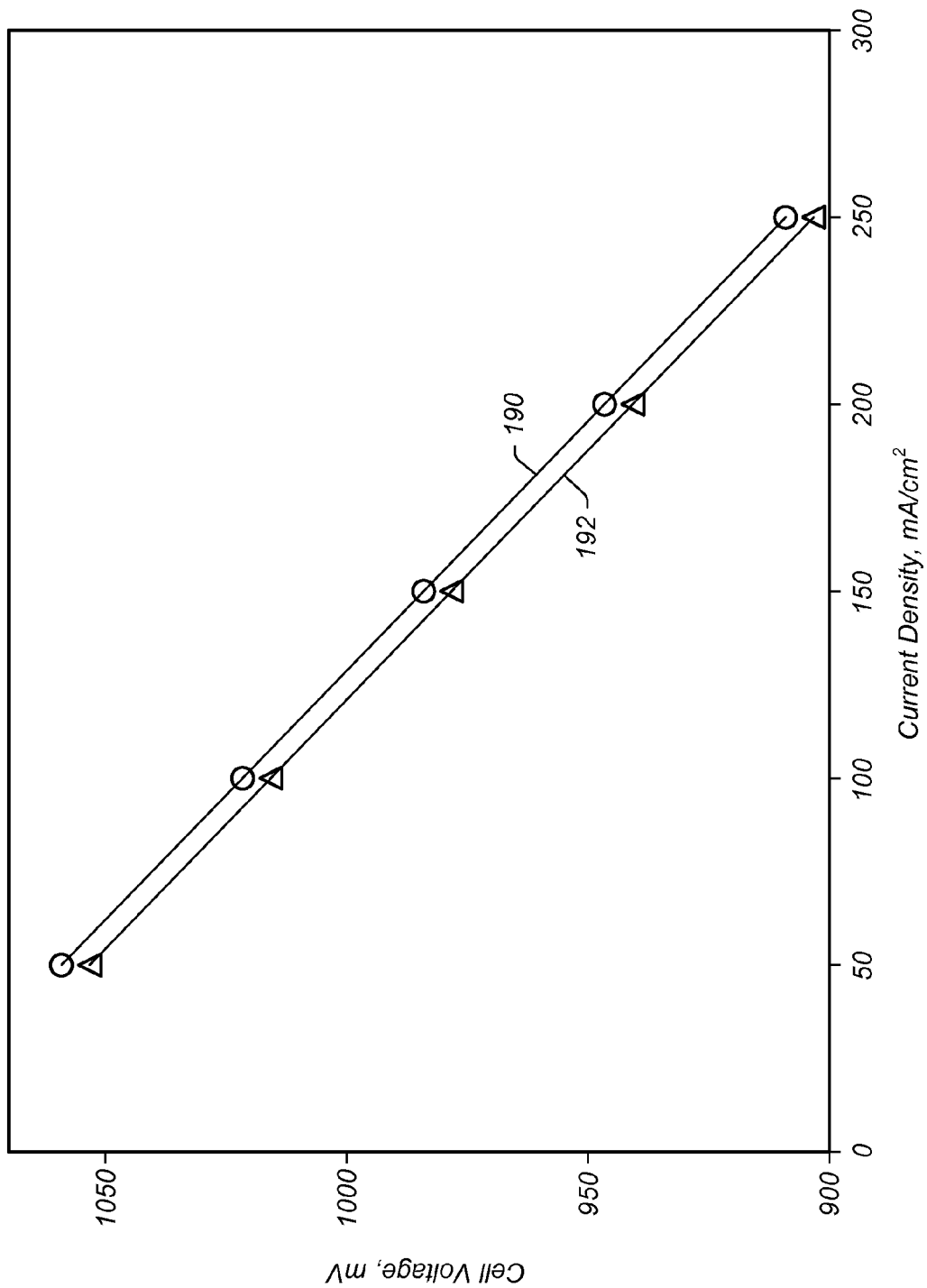
FIG. 10 depicts cell voltage (mV) versus current density ($mA/cm^2$) for embodiments of molten carbonate fuel cell systems using various fuel sources.

FIG. 10 depicts cell voltage (mV) versus current density (mA/cm$^2$) for molten carbonate fuel cell systems using benzene or methane as a fuel source. Data line 190 depicts cell voltage (mV) versus current density (mA/cm$^2$) at a hydrogen utilization of 20% using benzene as a feed source. Data line 192 depicts cell voltage (mV) versus current density (mA/cm$^2$) at a hydrogen utilization of 20% using methane as a feed source. As shown in FIG. 10, at all current densities, a higher cell voltage is observed for molten carbonate fuel cell systems when benzene is used as a fuel source for the first reformer.

Figure 11:
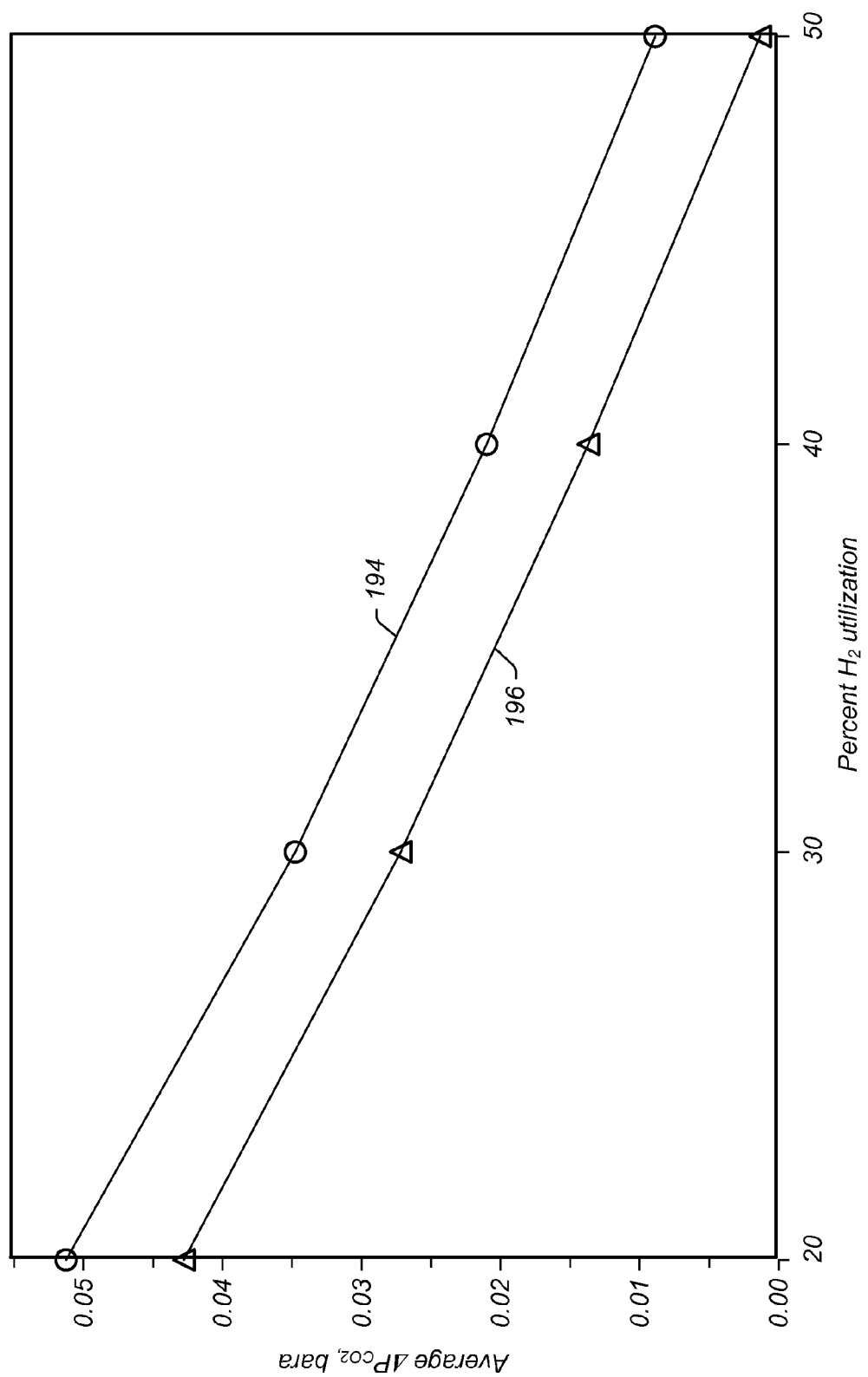
FIG. 11 depicts average excess carbon dioxide ($\Delta P_{CO2(avg)}$) versus percent hydrogen utilization for embodiments of molten carbonate fuel cell systems using various fuel sources.

FIG. 11 depicts average excess carbon dioxide ($\Delta P_{CO2\,(avg)}$) versus percent hydrogen utilization for a molten carbonate fuel cell systems using benzene or methane as a fuel source at a current density of 200 mA/cm$^2$. Data line 194 represents average excess carbon dioxide values at a given hydrogen utilization for benzene. Data 196 represents average excess carbon dioxide values for methane. As shown in FIG. 11, at hydrogen utilizations of less than 50%, benzene provides more excess carbon dioxide at a given hydrogen utilization than methane. Thus, more moles of carbon dioxide per mole of hydrogen is produced when benzene is used as a fuel source.

As shown in Examples 1-4, the molten carbonate fuel cell systems and processes described herein provide enhanced current density, current voltage, power density and inhibit carbon dioxide starvation of the fuel cell by providing a hydrogen-containing stream comprising molecular hydrogen to an anode portion of a molten carbonate fuel cell; controlling a flow rate of the hydrogen-containing stream to the anode such that molecular hydrogen utilization in the anode is less than 50%; mixing anode exhaust comprising molecular hydrogen from the molten carbonate fuel cell with a hydrocarbon stream comprising hydrocarbons, wherein the anode exhaust mixed with the hydrocarbon stream has a temperature from 500° C. to 700° C.; contacting at least a portion of the mixture of anode exhaust and the hydrocarbon stream with a catalyst to produce a steam reforming feed comprising one or more gaseous hydrocarbons, molecular hydrogen, and at least one carbon oxide; separating at least a portion of the molecular hydrogen from the steam reforming feed; and providing at least a portion of the separated molecular hydrogen to the molten carbonate fuel cell anode as at least a portion of the hydrogen-containing stream comprising molecular hydrogen.

We claim:

1. A process of operating a molten carbonate fuel cell, comprising:
   providing a hydrogen-containing stream comprising molecular hydrogen to an anode portion of a molten carbonate fuel cell;
   controlling a flow rate of the hydrogen-containing stream to the anode such that molecular hydrogen utilization in the anode is less than 50%;
   mixing anode exhaust comprising molecular hydrogen from the molten carbonate fuel cell with a hydrocarbon stream comprising hydrocarbons, wherein the anode exhaust mixed with the hydrocarbon stream has a temperature from 500° C. to 700° C.;
   contacting at least a portion of the mixture of anode exhaust and the hydrocarbon stream with a catalyst to produce a stream comprising one or more gaseous hydrocarbons, molecular hydrogen, and at least one carbon oxide;
   separating at least a portion of the molecular hydrogen from the stream comprising one or more gaseous hydrocarbons, molecular hydrogen, and at least one carbon oxide steam reforming feed; and
   providing at least a portion of the separated molecular hydrogen to the molten carbonate fuel cell anode as at least a portion of the hydrogen-containing stream comprising molecular hydrogen.

2. The process of claim 1, wherein the hydrogen-containing stream comprises at least 0.6 or at least about 0.95 mole fraction molecular hydrogen.

3. The process of claim 1, wherein at least some of the hydrocarbons of the hydrocarbon stream comprise one or more vaporizable hydrocarbons having a carbon number of at least 4.

4. The process of claim 1, further comprising feeding carbon dioxide to a cathode portion of the molten carbonate fuel cell in an amount such that partial pressure of carbon dioxide in a majority of the cathode portion of the molten carbonate fuel cell is higher than a partial pressure of carbon dioxide in a majority of an anode portion of the molten carbonate fuel cell.

5. The process of claim 4, wherein a difference between the partial pressure of carbon dioxide at the inlet or exhaust outlet of the cathode portion of the molten carbonate fuel cell and a partial pressure of carbon dioxide at the exhaust outlet of the anode portion of the molten carbonate fuel cell is at least 0.05 bara, or at least 0.1 bara, or at least 0.15 bara.

6. The process of claim 4, wherein at least a portion of the carbon dioxide provided to the cathode portion of the molten carbonate fuel cell is provided by a high temperature hydrogen-separation device.

7. The process of claim 1, further comprising, the steps of: separating at least a portion of a hydrogen-depleted gas stream comprising at least one of the carbon oxides and at least one of the gaseous hydrocarbons from the stream comprising one or more gaseous hydrocarbons, molecular hydrogen, and at least one carbon oxide, contacting at least a portion of the separated hydrogen-depleted stream with an oxidant to produce a heated stream, and providing at least a portion of the heat from the heated stream to the anode exhaust and/or to the hydrocarbon stream comprising hydrocarbons.

8. The process of claim 1, further comprising providing air and carbon dioxide to a cathode of the molten carbonate fuel cell, wherein the air comprises molecular oxygen, and controlling a flow rate of the air and/or carbon dioxide such that a molar ratio of carbon dioxide to molecular oxygen is at least 2.

9. The process of claim 1, further comprising mixing at least a portion of the molecular hydrogen provided to the molten carbonate anode with an oxidant at one or more anode electrodes in an anode of the molten carbonate fuel cell, and generating electricity from the molten carbonate fuel cell at an electrical power density of at least 0.1 W/cm$^2$.

* * * * *